(12) United States Patent
Gonenc et al.

(10) Patent No.: US 12,433,588 B2
(45) Date of Patent: Oct. 7, 2025

(54) INTEGRATED SENSORS FOR SURGICAL STAPLERS

(71) Applicant: Verb Surgical Inc., Santa Clara, CA (US)

(72) Inventors: Berk Gonenc, San Jose, CA (US); Benjamin Alan Sanker, San Jose, CA (US); Jose Luis Cordoba, Malaga (ES); Pablo Garcia Kilroy, Menlo Park, CA (US)

(73) Assignee: Verb Surgical, Santa Clara, CA (US)

( * ) Notice: Subject to any disclaimer, the term of this patent is extended or adjusted under 35 U.S.C. 154(b) by 0 days.

(21) Appl. No.: 17/504,880

(22) Filed: Oct. 19, 2021

(65) Prior Publication Data

US 2023/0123673 A1 Apr. 20, 2023

(51) Int. Cl.
| | |
|---|---|
| A61B 17/072 | (2006.01) |
| A61B 17/00 | (2006.01) |
| A61B 34/30 | (2016.01) |
| A61B 90/00 | (2016.01) |

(52) U.S. Cl.
CPC ........ *A61B 17/07207* (2013.01); *A61B 34/30* (2016.02); *A61B 2017/00039* (2013.01); *A61B 2017/07257* (2013.01); *A61B 2017/07271* (2013.01); *A61B 2034/302* (2016.02); *A61B 2090/064* (2016.02)

(58) Field of Classification Search
CPC .............. A61B 17/07207; A61B 34/30; A61B 2017/00039; A61B 2017/07257; A61B 2017/07271; A61B 2034/302; A61B 2090/064; A61B 2090/0065; G01L 5/0014

See application file for complete search history.

(56) References Cited

U.S. PATENT DOCUMENTS

| | | | | | |
|---|---|---|---|---|---|
| 4,719,538 | A | * | 1/1988 | Cox ..................... | G01D 5/2417 361/283.2 |
| 4,793,429 | A | * | 12/1988 | Bratton .................... | G01G 3/13 177/1 |
| 4,951,510 | A | * | 8/1990 | Holm-Kennedy ...... | G01P 15/18 73/514.31 |
| 5,345,824 | A | * | 9/1994 | Sherman ............... | G01P 15/131 73/514.32 |
| 5,436,795 | A | * | 7/1995 | Bishop .................. | G01L 9/0075 361/283.4 |

(Continued)

FOREIGN PATENT DOCUMENTS

| | | |
|---|---|---|
| EP | 3406205 A1 | 11/2018 |
| KR | 10-20140080488 A | 6/2014 |

OTHER PUBLICATIONS

"Small Temperature Sensor Chip Powers Itself Using Radio Waves," eTeknix, retrieved from the Internet <https://www.eteknix.com/small-temperature-sensor-chip-powers-using-radio-waves/>, 2015, 4 pages.

(Continued)

*Primary Examiner* — Robert F Long
*Assistant Examiner* — Eduardo R Ferrero
(74) *Attorney, Agent, or Firm* — Aikin & Gallant, LLP

(57) ABSTRACT

A surgical stapler for a surgical robotic system, the surgical stapler including a jaw coupled to a base, the jaw having a first anvil that moves relative to a second anvil between an open position and a closed position; and a force sensor operable to detect a force applied to the jaw.

20 Claims, 11 Drawing Sheets

(56) References Cited

U.S. PATENT DOCUMENTS

| | | | | |
|---|---|---|---|---|
| 5,492,020 | A * | 2/1996 | Okada | G01L 25/00 |
| | | | | 73/514.32 |
| 5,561,247 | A * | 10/1996 | Mutoh | G01L 9/0075 |
| | | | | 73/723 |
| 5,576,483 | A * | 11/1996 | Bonin | G01B 7/34 |
| | | | | 361/283.4 |
| 5,661,235 | A * | 8/1997 | Bonin | G01G 7/06 |
| | | | | 361/283.4 |
| 6,159,761 | A * | 12/2000 | Okada | G01P 15/0802 |
| | | | | 73/514.32 |
| 8,596,111 | B2 * | 12/2013 | Dargahi | G01N 3/40 |
| | | | | 73/78 |
| 8,893,946 | B2 * | 11/2014 | Boudreaux | A61B 17/068 |
| | | | | 606/205 |
| 10,555,790 | B2 * | 2/2020 | Paul | A61M 25/0067 |
| 10,876,907 | B2 * | 12/2020 | Yoon | G01L 1/146 |
| 11,060,927 | B2 * | 7/2021 | O'Connell | G01L 1/18 |
| 11,100,631 | B2 * | 8/2021 | Yates | A61B 1/0638 |
| 2002/0039271 | A1 * | 4/2002 | Fournier | G01D 5/2417 |
| | | | | 361/290 |
| 2002/0149571 | A1 * | 10/2002 | Roberts | G06F 3/04142 |
| | | | | 345/173 |
| 2003/0036214 | A1 * | 2/2003 | Eskridge | G01P 15/125 |
| | | | | 438/48 |
| 2004/0237650 | A1 * | 12/2004 | Yang | G01P 15/125 |
| | | | | 73/514.32 |
| 2005/0131390 | A1 * | 6/2005 | Heinrich | A61B 17/07207 |
| | | | | 606/1 |
| 2005/0229710 | A1 * | 10/2005 | O'Dowd | G01L 13/025 |
| | | | | 73/718 |
| 2007/0043725 | A1 * | 2/2007 | Hotelling | G06F 3/016 |
| | | | | 707/999.009 |
| 2007/0179408 | A1 * | 8/2007 | Soltz | A61B 17/07207 |
| | | | | 600/587 |
| 2007/0205776 | A1 * | 9/2007 | Harish | G01G 7/06 |
| | | | | 324/662 |
| 2007/0227257 | A1 * | 10/2007 | Harish | G01G 7/06 |
| | | | | 73/780 |
| 2008/0087105 | A1 * | 4/2008 | Renken | G01L 5/0047 |
| | | | | 73/862.68 |
| 2008/0296346 | A1 * | 12/2008 | Shelton, IV | A61B 34/71 |
| | | | | 227/180.1 |
| 2008/0300580 | A1 * | 12/2008 | Shelton, IV | A61B 17/07207 |
| | | | | 606/1 |
| 2009/0033078 | A1 * | 2/2009 | Hawes | B60R 21/01532 |
| | | | | 280/735 |
| 2009/0065267 | A1 * | 3/2009 | Sato | G06F 3/044 |
| | | | | 345/174 |
| 2009/0076534 | A1 * | 3/2009 | Shelton, IV | A61B 17/07207 |
| | | | | 713/193 |
| 2010/0058583 | A1 * | 3/2010 | Cros | A61B 5/6882 |
| | | | | 257/E21.09 |
| 2011/0011915 | A1 * | 1/2011 | Shelton, IV | A61B 17/068 |
| | | | | 227/176.1 |
| 2011/0088435 | A1 * | 4/2011 | Niarfeix | G01B 7/22 |
| | | | | 68/12.27 |
| 2011/0107842 | A1 * | 5/2011 | Dargahi | G01N 3/40 |
| | | | | 73/788 |
| 2011/0174862 | A1 * | 7/2011 | Shelton, IV | A61B 17/068 |
| | | | | 227/176.1 |
| 2011/0245865 | A1 * | 10/2011 | Harper | A61B 17/442 |
| | | | | 606/205 |
| 2011/0295295 | A1 * | 12/2011 | Shelton, IV | A61B 34/30 |
| | | | | 606/170 |
| 2012/0180575 | A1 * | 7/2012 | Sakano | G01L 5/165 |
| | | | | 73/862.626 |
| 2012/0228358 | A1 * | 9/2012 | Zemlok | A61B 17/072 |
| | | | | 227/176.1 |
| 2013/0193188 | A1 * | 8/2013 | Shelton, IV | A61B 17/07207 |
| | | | | 227/175.2 |
| 2013/0274712 | A1 * | 10/2013 | Schecter | A61B 34/76 |
| | | | | 604/100.01 |
| 2014/0012299 | A1 | 1/2014 | Stoddard et al. | |
| 2014/0067123 | A1 * | 3/2014 | Park | G01L 1/246 |
| | | | | 73/862.041 |
| 2014/0114327 | A1 * | 4/2014 | Boudreaux | A61B 34/25 |
| | | | | 606/130 |
| 2015/0327914 | A1 | 11/2015 | McKenna et al. | |
| 2016/0030240 | A1 * | 2/2016 | Gonenc | A61B 17/2909 |
| | | | | 606/205 |
| 2016/0066909 | A1 | 3/2016 | Baber et al. | |
| 2016/0066916 | A1 * | 3/2016 | Overmyer | H02H 3/207 |
| | | | | 227/176.1 |
| 2016/0074039 | A1 * | 3/2016 | Beetel | A61B 90/06 |
| | | | | 227/175.1 |
| 2016/0089175 | A1 | 3/2016 | Hibner et al. | |
| 2016/0256187 | A1 * | 9/2016 | Shelton, IV | A61B 17/295 |
| 2017/0143441 | A1 * | 5/2017 | Paul | G01L 5/165 |
| 2017/0224280 | A1 * | 8/2017 | Bozkurt | G01L 5/0014 |
| 2017/0238991 | A1 * | 8/2017 | Worrell | H05K 3/0011 |
| 2017/0296177 | A1 * | 10/2017 | Harris | A61B 17/0686 |
| 2017/0296178 | A1 * | 10/2017 | Miller | A61B 5/4869 |
| 2017/0296179 | A1 * | 10/2017 | Shelton, IV | G16H 20/40 |
| 2017/0296180 | A1 * | 10/2017 | Harris | G16H 20/40 |
| 2017/0296183 | A1 * | 10/2017 | Shelton, IV | A61B 17/072 |
| 2017/0296189 | A1 * | 10/2017 | Vendely | A61B 17/105 |
| 2017/0354468 | A1 * | 12/2017 | Johnson | A61B 34/74 |
| 2018/0049820 | A1 * | 2/2018 | Widenhouse | A61B 34/37 |
| 2018/0049821 | A1 * | 2/2018 | Shelton, IV | A61B 17/320068 |
| 2018/0073942 | A1 * | 3/2018 | Wu | G01L 5/165 |
| 2018/0126504 | A1 * | 5/2018 | Shelton, IV | A61B 17/068 |
| 2018/0360446 | A1 * | 12/2018 | Shelton, IV | A61B 17/068 |
| 2018/0360454 | A1 * | 12/2018 | Shelton, IV | A61B 17/105 |
| 2018/0360473 | A1 * | 12/2018 | Shelton, IV | A61B 34/76 |
| 2019/0000446 | A1 * | 1/2019 | Shelton, IV | A61B 17/07292 |
| 2019/0000448 | A1 * | 1/2019 | Shelton, IV | A61B 17/0682 |
| 2019/0000478 | A1 * | 1/2019 | Messerly | A61B 18/1445 |
| 2019/0189898 | A1 * | 6/2019 | Sieber | H10N 30/857 |
| 2019/0200863 | A1 * | 7/2019 | Shelton, IV | H04L 67/12 |
| 2019/0200981 | A1 * | 7/2019 | Harris | H04N 7/183 |
| 2019/0200985 | A1 * | 7/2019 | Shelton, IV | G16H 30/20 |
| 2019/0200986 | A1 * | 7/2019 | Shelton, IV | A61B 90/98 |
| 2019/0200987 | A1 | 7/2019 | Shelton et al. | |
| 2019/0200998 | A1 * | 7/2019 | Shelton, IV | A61B 5/0066 |
| 2019/0201020 | A1 * | 7/2019 | Shelton, IV | A61B 17/29 |
| 2019/0201044 | A1 | 7/2019 | Shelton, IV et al. | |
| 2019/0201080 | A1 * | 7/2019 | Messerly | A61B 17/320092 |
| 2019/0201146 | A1 * | 7/2019 | Shelton, IV | G16H 40/60 |
| 2019/0336228 | A1 * | 11/2019 | Blumenkranz | A61B 34/71 |
| 2020/0015877 | A1 | 1/2020 | Hubelbank et al. | |
| 2020/0222111 | A1 | 7/2020 | Yates et al. | |
| 2020/0237372 | A1 | 7/2020 | Park | |
| 2020/0245873 | A1 | 8/2020 | Frank et al. | |
| 2020/0352639 | A1 | 11/2020 | Batchelor et al. | |
| 2020/0367984 | A1 * | 11/2020 | Peine | B25J 9/1666 |
| 2020/0405375 | A1 * | 12/2020 | Shelton, IV | A61B 18/1815 |
| 2020/0405414 | A1 * | 12/2020 | Shelton, IV | A61B 17/320092 |
| 2021/0153928 | A1 | 5/2021 | Lennartz et al. | |
| 2021/0275053 | A1 * | 9/2021 | Shelton, IV | A61B 17/07207 |
| 2021/0295990 | A1 * | 9/2021 | Joseph | G01N 33/0062 |
| 2022/0104820 | A1 * | 4/2022 | Shelton, IV | A61B 17/07207 |
| 2022/0192733 | A1 | 6/2022 | Koett et al. | |
| 2023/0000359 | A1 * | 1/2023 | Saadat | A61B 90/36 |

OTHER PUBLICATIONS

Covidien, "Covidien SCD396 Sonicision Cordless Ultrasonic Dissection Device, 6 per Case," Tiger Medical, retrieved from the Internet <https://www.tigermedical.com/Products/Sonicision-Cordless-Ultrasonic-Dissection-Device-6-per-Case_COVSCD396.aspx>, 2021, 1 page.

"ENSEAL X1 Large Jaw Tissue Sealer," retrieved from the Internet <https://https://www.jnjmedicaldevices.com/en-US/product/enseal-x1-large-jaw-tissue-sealer?utm_source=google&utm_medium=cpc&utm_campaign=ethicon-us%2B2021%2Benseal-branded%3BS%3BMD%3BBR%3BSUR%3BHCP%3BBR&utm_content=General&utm_term=%2Benseal&gclid=EAlalQobChMIwOmxl9vH8wIVRbKGCh2qtAmyEAAYASAAEgLu3PD_BwE&gclsrc=aw.ds>, Sep. 2019, 8 pages.

(56) References Cited

OTHER PUBLICATIONS

Olympus Medical Systems Europe and MEA, "THUNDERBEAT Open Extended Jaw—Advanced Open Surgery," retrieved from the Internet <https://www.youtube.com/watch?v=O8isvo_VW7s>, Dec. 1, 2014.

PCT/IB2022/058731, "PCT Notification of Transmittal of the International Search Report and the Written Opinion of the International Searching Authority, or the Declaration", Mailed Jan. 2, 2023, 19 pages.

* cited by examiner

INTEGRATED SENSORS FOR SURGICAL STAPLERS

TECHNICAL FIELD

This disclosure relates generally to the field of robotic surgery and, more particularly, to surgical stapler systems and methods for detecting tissue characteristics to help improve the stapling process.

BACKGROUND

Minimally-invasive surgery (MIS), such as laparoscopic surgery, involves techniques intended to reduce tissue damage during a surgical procedure. For example, laparoscopic procedures typically involve creating a number of small incisions in the patient (e.g., in the abdomen), and introducing one or more tools, for example a surgical stapler and/or an energy device, and at least one endoscopic camera through the incisions into the patient. The surgical procedures are then performed by using the introduced tools, with the visualization aid provided by the camera. Generally, MIS provides multiple benefits, such as reduced patient scarring, less patient pain, shorter patient recovery periods, and lower medical treatment costs associated with patient recovery. In some embodiments, MIS may be performed with robotic systems that include one or more robotic arms for manipulating surgical instruments based on commands from an operator.

SUMMARY

Aspects of the disclosure include surgical stapling tools having integrated sensors and architectures that provide information to the user (e.g., a surgeon), such as the tissue compression force, the tissue location in the graspers, presence of a foreign object between the graspers and/or characterization of the grasped tissue, that can be used during a stapling operation by the surgeon. The information may be transmitted wirelessly to a display to the surgeon in real-time and/or streamed onto various platforms for use in control systems or machine learning algorithms as a supplemental data source to artificial intelligence and digital surgery. Typically, while using a surgical stapler, the surgical view of the tissue is very limited for the surgeon. It is therefore difficult, and mostly dependent on the experience of the surgeon, to determine if the tissue has been optimally grasped before firing the staples through the tissue. As a result, tissues which are partially clamped (tissue not centrally located in the jaw) without sufficient force, presence of a foreign stiff object between the anvils of the jaw, or clamping onto a tumor partially while dealing with cancerous tissues, can prevent the formation of a successful staple and seal. This, in turn, may lead to excessive bleeding and tissue damage during the surgery, and hence dangerous intra-operative complications. The aspects disclosed herein address these problems by introducing sensors on/around the clamping area, that are used to determine characteristics associated with the stapling operation (e.g., information and/or measurements) that can help surgeons to manually make the right decision before firing the staples, and/or can be fed into artificial intelligence algorithms and used in combination with robotic systems to alert, warn and/or automatically guide surgeons during the operation. The characteristics, information and/or measurements that can help improve the stapling process (measurement goals) may include, but are not limited (1) total clamping force and/or its center of application; (2) clamping or pressure profile/variation along the jaw; and/or (3) stiffness of the grasped tissue. Representatively, the detection of total clamping force and/or its center of application can be used by the surgeon to confirm that the clamping force is suitable for proceeding with the stapling operation and/or that the tissue is properly positioned in the jaw. The detection of an inconsistent or irregular profile may indicate an irregularity in the tissue or misalignment of the tissue in the jaw such that stapling should not proceed. A detection of sudden changes in stiffness may signal the presence of a foreign object or hard tumorous tissue, in which case the surgeon may determine stapling should not proceed.

Representatively, in one aspect the disclosure is directed to a surgical stapler for a surgical robotic system, the surgical stapler comprising: a jaw coupled to a base, the jaw having a first anvil that moves relative to a second anvil between an open position and a closed position; and a force sensor operable to detect a force applied to the jaw. In some aspects, the force sensor is a capacitive sensor mounted to the first anvil. In some aspects, the force sensor is a capacitive sensor mounted to the second anvil. In some aspects, the second anvil includes a channel operable to receive a staple cartridge and the capacitive sensor is coupled to the channel. In some aspects, the force sensor is coupled to the base. In some aspects, the surgical stapler may further include at least one magnet coupled to the first anvil and at least one Hall effect sensor coupled to the second anvil. In some aspects, the force sensor may be a first capacitive sensor coupled to a distal end of the jaw and the surgical stapler further comprises a second capacitive sensor coupled to a proximal end of the jaw. In some aspects, the force sensor is a capacitive sensor that is one of an array of capacitive sensors mounted to the first anvil or the second anvil. In some aspects, the force sensor is a strain gauge array coupled to the first anvil or the second anvil. In some aspects, the force detected by the force sensor is analyzed by one or more processors coupled to the surgical stapler to determine whether a total clamping force or a force application center location is suitable for proceeding with a stapling operation.

In another aspect, a surgical robotic stapler system is provided including a robotic surgical stapler having a jaw coupled to a base, the jaw having a first anvil that moves relative to a second anvil between an open position and a closed position during a stapling operation; one or more force sensors configured to detect a force applied to the jaw and provide a force value; and one or more processors configured to analyze the force value to determine a characteristic relating to the stapling operation. In some aspects, the one or more force sensors include at least two force sensors that each detect a force and provide a force value, and wherein the characteristic determined by analyzing the force values comprises (1) a total clamping force on a tissue or (2) a center of application of the force on the tissue. In some aspects, based on the determined total clamping force on the tissue, the one or more processors further determine whether the clamping force is suitable for the stapling operation to proceed. In some aspects, based on the determined center of application of the force on the tissue, the one or more processors further determine whether the tissue is at an acceptable position within the jaw to proceed with the stapling operation. In some aspects, the one or more force sensors may include an array of force sensors that each detect a force and provide a force value, and wherein the characteristic determined by analyzing the force values comprises a force distribution profile along the jaw. In some aspects, based on the force distribution profile, the one or more processors further determine whether a local stiffness is present in the tissue. In some aspects, based on the force distribution profile, the one or more processors further determine whether a foreign object is positioned within the jaw. In some aspects, the one or more force sensors comprise a strain gauge array that detects a force and provides a force value, and wherein the characteristic determined by analyzing the force value comprises a deformation of the first anvil or the second anvil. In some aspects, based on the deformation of the first anvil or the second anvil, the one or more processors further determine a type of tissue in the jaw. In some aspects, the system further includes alerting a user when the determined characteristic indicates the stapling operation should not proceed.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

DETAILED DESCRIPTION

Figure 1:
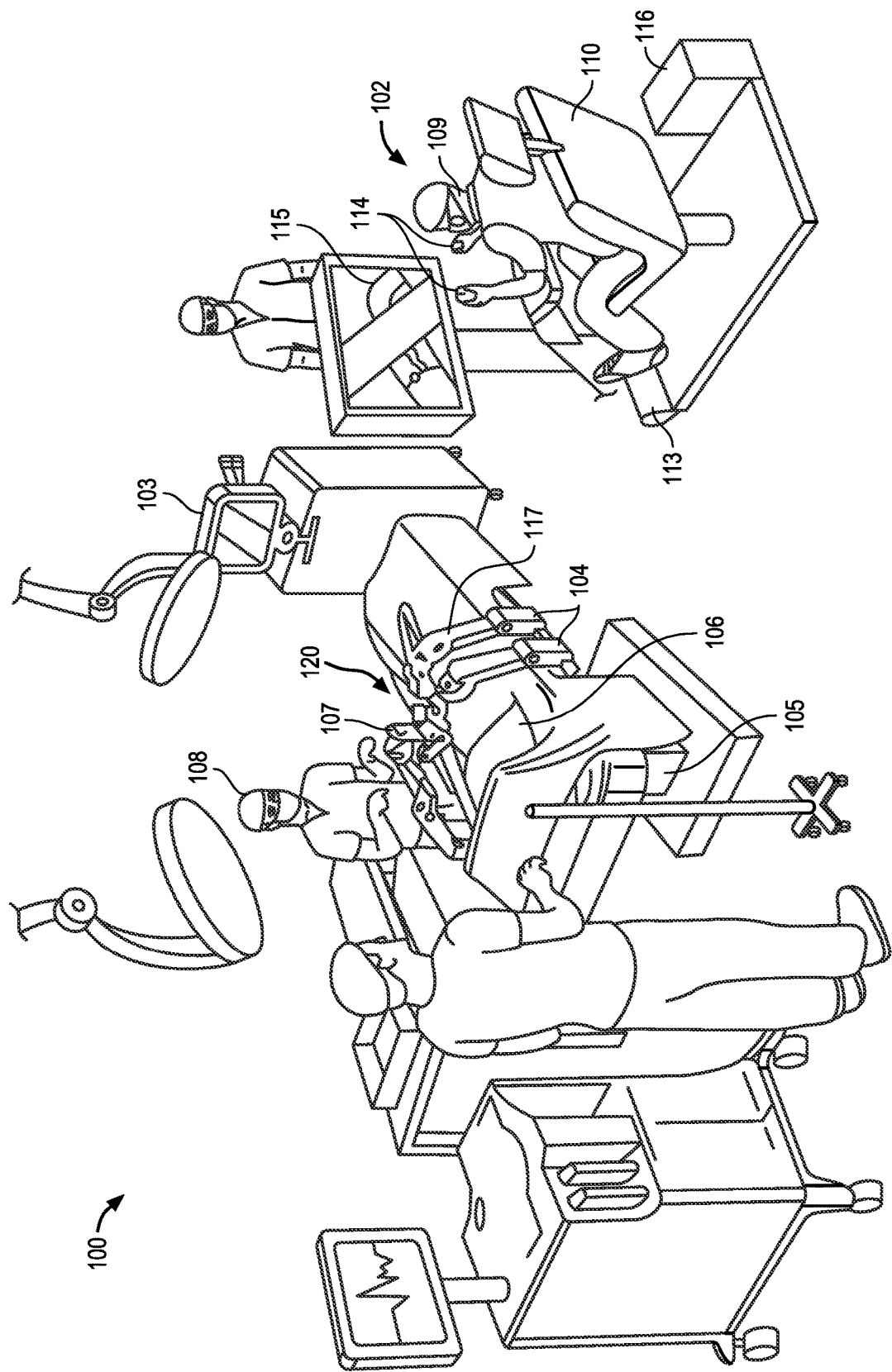
FIG. 1 is an overview schematic of an operating room arrangement with a surgical robotic system.

In various embodiments, description is made with reference to the figures.

However, certain embodiments may be practiced without one or more of these specific details, or in combination with other known methods and configurations. In the following description, numerous specific details are set forth, such as specific configurations, dimensions, and processes, in order to provide a thorough understanding of the embodiments. In other instances, well-known processes and manufacturing techniques have not been described in particular detail in order to not unnecessarily obscure the description. Reference throughout this specification to "one embodiment," "an embodiment," or the like, means that a particular feature, structure, configuration, or characteristic described is included in at least one embodiment. Thus, the appearance of the phrase "one embodiment," "an embodiment," or the like, in various places throughout this specification are not necessarily referring to the same embodiment. Furthermore, the particular features, structures, configurations, or characteristics may be combined in any suitable manner in one or more embodiments.

In addition, the terminology used herein is for the purpose of describing particular aspects only and is not intended to be limiting of the invention. Spatially relative terms, such as "beneath", "below", "lower", "above", "upper", and the like may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (e.g., rotated 90 degrees or at other orientations) and the spatially relative descriptors used herein interpreted accordingly.

As used herein, the singular forms "a", "an", and "the" are intended to include the plural forms as well, unless the context indicates otherwise. It will be further understood that the terms "comprises" and/or "comprising" specify the presence of stated features, steps, operations, elements, and/or components, but do not preclude the presence or addition of one or more other features, steps, operations, elements, components, and/or groups thereof.

The terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

Moreover, the use of relative terms throughout the description may denote a relative position or direction. For example, "distal" may indicate a first direction away from a reference point, e.g., away from a user. Similarly, "proximal" may indicate a location in a second direction opposite to the first direction, e.g., toward the user. Such terms are provided to establish relative frames of reference, however, and are not intended to limit the use or orientation of any particular surgical robotic component to a specific configuration described in the various embodiments below.

Referring to FIG. 1, this is a pictorial view of an example surgical robotic system 100 in an operating arena. The surgical robotic system 100 includes a user console 102, a control tower 103, and one or more surgical robots 120, including robotic arms 104 at a surgical robotic platform 105, e.g., an operating table, a bed, etc. The system 100 can incorporate any number of devices, tools, or accessories used to perform surgery on a patient 106. For example, the system 100 may include one or more surgical tools 107 used to perform surgery. A surgical tool 107 may be an end effector that is attached to a distal end of a surgical arm 104, for executing a surgical procedure.

Each surgical tool 107 may be manipulated manually, robotically, or both, during the surgery. For example, the surgical tool 107 may be a tool used to enter, view, or manipulate an internal anatomy of the patient 106. In an embodiment, the surgical tool 107 is a grasper that can grasp tissue of the patient. The surgical tool 107 may be controlled manually, by a bedside operator 108; or it may be controlled robotically, via actuated movement of the surgical robotic arm 104 to which it is attached. The robotic arms 104 are shown as a table-mounted system, but in other configurations the arms 104 may be mounted in a cart, ceiling or sidewall, or in another suitable structural support.

Generally, a remote operator 109, such as a surgeon or other operator, may use the user console 102 to remotely manipulate the arms 104 and/or the attached surgical tools 107, e.g., teleoperation. Teleoperation may be engaged or disengaged based on the user actions. It should be understood that "engaging" the teleoperation mode is intended to refer to an operation in which, for example, a UID or foot pedal that is prevented from controlling the surgical instrument, is transitioned to a mode (e.g., a teleoperation mode) in which it can now control the surgical instrument. On the other hand, disengaging the teleoperation mode is intended to refer to an operation which occurs when the system is in a teleoperation mode, and then transitioned to a mode (non-teleoperation mode) in which the UID or foot pedal can no longer control the surgical instrument. For example, teleoperation mode may be disengaged when the system determines that a detected movement is an unintended action or movement by the user or the user engages in any other action which suggests teleoperation mode should no longer be engaged.

The user console 102 may be located in the same operating room as the rest of the system 100, as shown in FIG. 1. In other environments however, the user console 102 may be located in an adjacent or nearby room, or it may be at a remote location, e.g., in a different building, city, or country. The user console 102 may comprise a seat 110, one or more user interface devices, for example, foot-operated controls 113 or handheld user input devices (UID) 114, and at least one user display 115 that is configured to display, for example, a view of the surgical site inside the patient 106. In the example user console 102, the remote operator 109 is sitting in the seat 110 and viewing the user display 115 while manipulating a foot-operated control 113 and a handheld UID 114 in order to remotely control the arms 104 and the surgical tools 107 (that are mounted on the distal ends of the arms 104).

In some variations, the bedside operator 108 may also operate the system 100 in an "over the bed" mode, in which the bedside operator 108 (user) is now at a side of the patient 106 and is simultaneously manipulating a robotically-driven tool (end effector as attached to the arm 104), e.g., with a handheld UID 114 held in one hand, and a manual laparoscopic tool. For example, the bedside operator's left hand may be manipulating the handheld UID to control a robotic component, while the bedside operator's right hand may be manipulating a manual laparoscopic tool. Thus, in these variations, the bedside operator 108 may perform both robotic-assisted minimally invasive surgery and manual laparoscopic surgery on the patient 106.

During an example procedure (surgery), the patient 106 is prepped and draped in a sterile fashion to achieve anesthesia. Initial access to the surgical site may be performed manually while the arms of the robotic system 100 are in a stowed configuration or withdrawn configuration (to facilitate access to the surgical site). To create a port for enabling introduction of a surgical instrument into the patient 106, a trocar assembly may be at least partially inserted into the patient through an incision or entry point in the patient (e.g., in the abdominal wall). The trocar assembly may include a cannula or trocar, an obturator, and/or a seal. In some variations, the trocar assembly can include an obturator such as a needle with a sharpened tip for penetrating through a patient's skin. The obturator may be disposed within the lumen of the cannula when being inserted into the patient 106, and then removed from the cannula such that a surgical instrument may be inserted through the lumen of the cannula. Once positioned within the body of the patient 106, the cannula may provide a channel for accessing a body cavity or other site within the patient 106, for example, such that one or more surgical instruments or tools can be inserted into a body cavity of the patient 106, as described further herein. It will be understood that the cannula as described herein may be part of a trocar, and can optionally include an obturator or other components.

Once access is completed, initial positioning or preparation of the robotic system 100 including its arms 104 may be performed. Next, the surgery proceeds with the remote operator 109 at the user console 102 utilising the foot-operated controls 113 and the UIDs 114 to manipulate the various end effectors and perhaps an imaging system, to perform the surgery. Manual assistance may also be provided at the procedure bed or table, by sterile-gowned bedside personnel, e.g., the bedside operator 108 who may perform tasks such as retracting tissues, performing manual repositioning, and tool exchange upon one or more of the robotic arms 104. Non-sterile personnel may also be present to assist the remote operator 109 at the user console 102. When the procedure or surgery is completed, the system 100 and the user console 102 may be configured or set in a state to facilitate post-operative procedures such as cleaning or sterilisation and healthcare record entry or printout via the user console 102.

In one embodiment, the remote operator 109 holds and moves the UID 114 to provide an input command to move a robot arm actuator 117 in the robotic system 100. The UID 114 may be communicatively coupled to the rest of the robotic system 100, e.g., via a console computer system 116. Representatively, in some embodiments, UID 114 may be a portable handheld user input device or controller that is ungrounded with respect to another component of the surgical robotic system. For example, UID 114 may be ungrounded while either tethered or untethered from the user console. The term "ungrounded" is intended to refer to implementations where, for example, both UIDs are neither mechanically nor kinematically constrained with respect to the user console. For example, a user may hold a UID 114 in a hand and move freely to any possible position and orientation within space only limited by, for example, a tracking mechanism of the user console. The UID 114 can generate spatial state signals corresponding to movement of the UID 114, e.g. position and orientation of the handheld housing of the UID, and the spatial state signals may be input signals to control a motion of the robot arm actuator 117. The robotic system 100 may use control signals derived from the spatial state signals, to control proportional motion of the actuator 117. In one embodiment, a console processor of the console computer system 116 receives the spatial state signals and generates the corresponding control signals. Based on these control signals, which control how the actuator 117 is energized to move a segment or link of the arm 104, the movement of a corresponding surgical tool that is attached to the arm may mimic the movement of the UID 114. Similarly, interaction between the remote operator 109 and the UID 114 can generate for example a grip control signal that causes a jaw of a grasper of the surgical tool 107 to close and grip the tissue of patient 106.

The surgical robotic system 100 may include several UIDs 114, where respective control signals are generated for each UID that control the actuators and the surgical tool (end effector) of a respective arm 104. For example, the remote operator 109 may move a first UID 114 to control the motion of an actuator 117 that is in a left robotic arm, where the actuator responds by moving linkages, gears, etc., in that arm 104. Similarly, movement of a second UID 114 by the remote operator 109 controls the motion of another actuator 117, which in turn moves other linkages, gears, etc., of the robotic system 100. The robotic system 100 may include a right arm 104 that is secured to the bed or table to the right side of the patient, and a left arm 104 that is at the left side of the patient. An actuator 117 may include one or more motors that are controlled so that they drive the rotation of a joint of the arm 104, to for example change, relative to the patient, an orientation of an endoscope or a grasper of the surgical tool 107 that is attached to that arm. Motion of several actuators 117 in the same arm 104 can be controlled by the spatial state signals generated from a particular UID 114. The UIDs 114 can also control motion of respective surgical tool graspers. For example, each UID 114 can generate a respective grip signal to control motion of an actuator, e.g., a linear actuator, that opens or closes jaws of the grasper at a distal end of surgical tool 107 to grip tissue within patient 106. In some aspects, the surgical tool grasper may be a surgical stapler and the UIDs 114 are used to control the opening or closing of the jaw of the surgical stapler as well as the release of staples through the tissue. When the user is finished controlling the surgical tools with the UIDs 114, the user may dock (i.e., store) the UIDs 114 with docking stations or UID holders located on the console 102.

In some aspects, the communication between the platform 105 and the user console 102 may be through a control tower 103, which may translate user commands that are received from the user console 102 (and more particularly from the console computer system 116) into robotic control commands that are transmitted to the arms 104 on the robotic platform 105. The control tower 103 may also transmit status and feedback from the platform 105 back to the user console 102. The communication connections between the robotic platform 105, the user console 102, and the control tower 103 may be via wired and/or wireless links, using any suitable ones of a variety of data communication protocols. Any wired connections may be optionally built into the floor and/or walls or ceiling of the operating room. The robotic system 100 may provide video output to one or more displays, including displays within the operating room as well as remote displays that are accessible via the Internet or other networks. The video output or feed may also be encrypted to ensure privacy and all or portions of the video output may be saved to a server or electronic healthcare record system. It will be appreciated that the operating room scene in FIG. 1 is illustrative and may not accurately represent certain medical practices.

Figure 2:
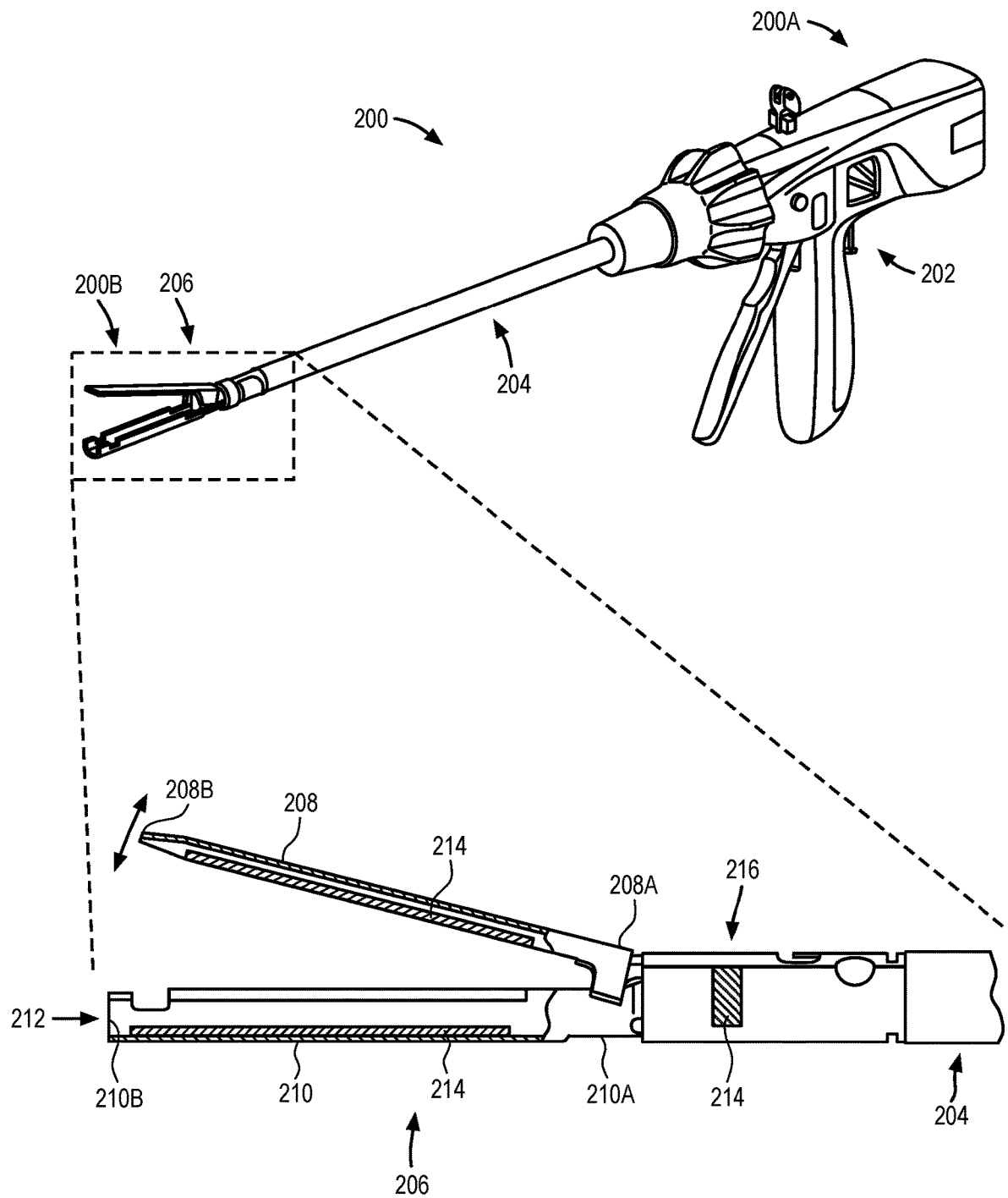
FIG. 2 is a perspective side view of one aspect of a surgical stapler of a surgical robotic system.

Turning now to FIG. 2, FIG. 2 illustrates a perspective view of one exemplary surgical tool, in this instance, a surgical stapler 200 for a surgical robotic system. Stapler 200 may include a proximal end 200A that is held by the user during a stapling operation outside of the patient and a distal end 200B that is inserted into the patient during a stapling operation. Stapler 200 may include a handle portion 202, a shaft portion 204, a ring or base portion 216 coupled to the shaft portion 204 and a jaw 206 coupled to the ring or base portion 216. The handle portion 202 may include various mechanisms suitable for manipulating the jaw 206 within the patient and actuating the stapling operation (e.g., a firing handle for actuating staple release). The shaft portion 204 may be an elongated portion that connects the handle portion 202 to the ring or base 216 and jaw 206. The shaft portion 204 may enclose circuitry or other components running from the handle portion 202 to jaw 206 for controlling the jaw 206. The shaft portion 204 may be used to insert and position the jaw 206 within the patient.

As can be seen from the exploded view of jaw 206, jaw 206 includes a first anvil 208 and a second anvil 210. First anvil 208 may have a proximal end 208A coupled to the ring 216 and a distal end 208B that is a free end distal to the proximal end 208A. First anvil 208 may be movably coupled to ring 216 at a pivot point (e.g., a pivot joint) near the proximal end 208A such that first anvil 208 moves relative to second anvil 210 between an open position (as shown) and a closed position. Similarly, second anvil 210 may have a proximal end 210A coupled to the ring 216 and a distal end 210B that is a free end distal to the proximal end 210A. In some aspects, second anvil 210 may be fixedly coupled to the ring 216 at the proximal end 210A such that it is a relatively rigid and fixed part of the surgical stapler 200. Second anvil 210 may further include a channel 212 running along its length and which is dimensioned to hold a stapler cartridge (not shown). During a stapling operation, staples may be released (e.g., fired) from the stapler cartridge in the second anvil 210 through a tissue clamped or grasped between second anvil 210 and first anvil 208. Representatively, during a surgical stapling operation, the surgeon inserts jaw 206 into the patient until the desired surgical site is reached. The surgeon then manipulates jaw 206 between the open position and the closed position to clamp onto the tissue at the desired surgical site. The actuator (e.g., trigger) at the handle portion 202 is then used by the surgeon to release the staple from the cartridge and into the clamped tissue.

To facilitate the surgeon in determining that the tissue is suitable, and is in a proper position, for stapling, stapler 200 further includes one or more sensors 214. One or more sensors 214 may be mounted to the first anvil 208, second anvil 210 and/or ring 216. It is contemplated that any number of sensors 214, at any number of positions along stapler 200, may be used. One or more sensors 214 may include one or more of a force or pressure sensor, for example, a capacitive sensor, or one or more strain gauge sensors. Other types of sensors suitable for obtaining the desired force and/or pressure information are, however, contemplated. The information obtained from the sensors 214 may be analyzed by one or more processors associated with the stapler 200 to determine (1) total clamping force and/or its center of application; (2) clamping or pressure profile/variation along the jaw; and/or (3) stiffness of the grasped tissue. This information may, in turn, be displayed (e.g., on display 115) or otherwise communicated or provided to the surgeon (e.g., wirelessly). The surgeon may use this information to confirm, for example, that the clamping force is suitable for proceeding with the stapling operation, that the tissue is properly positioned in the jaw, irregularities in the tissue or misalignment of the tissue in the jaw and/or presence of a foreign object or hard tumorous tissue, or other conditions that can be used by the surgeon to confirm whether or not to proceed with the stapling operation.

Figure 3:
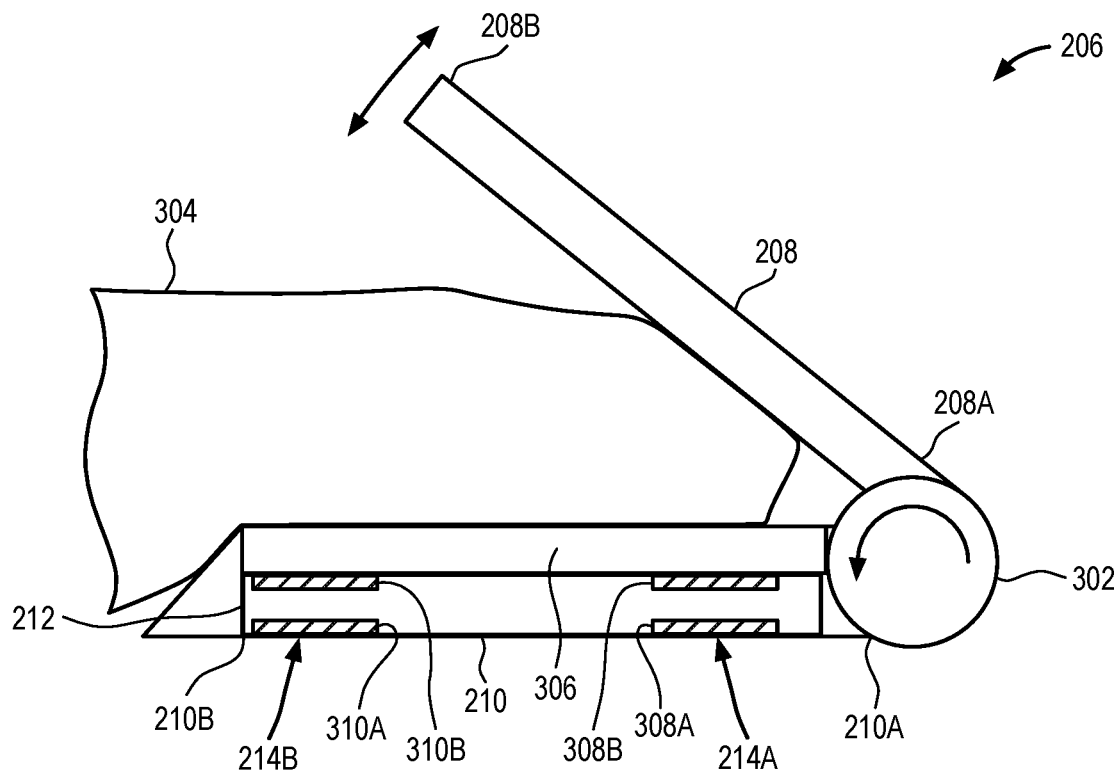
FIG. 3 is a cross-sectional side view of another aspect of a surgical stapler of a surgical robotic system.
Figure 4:
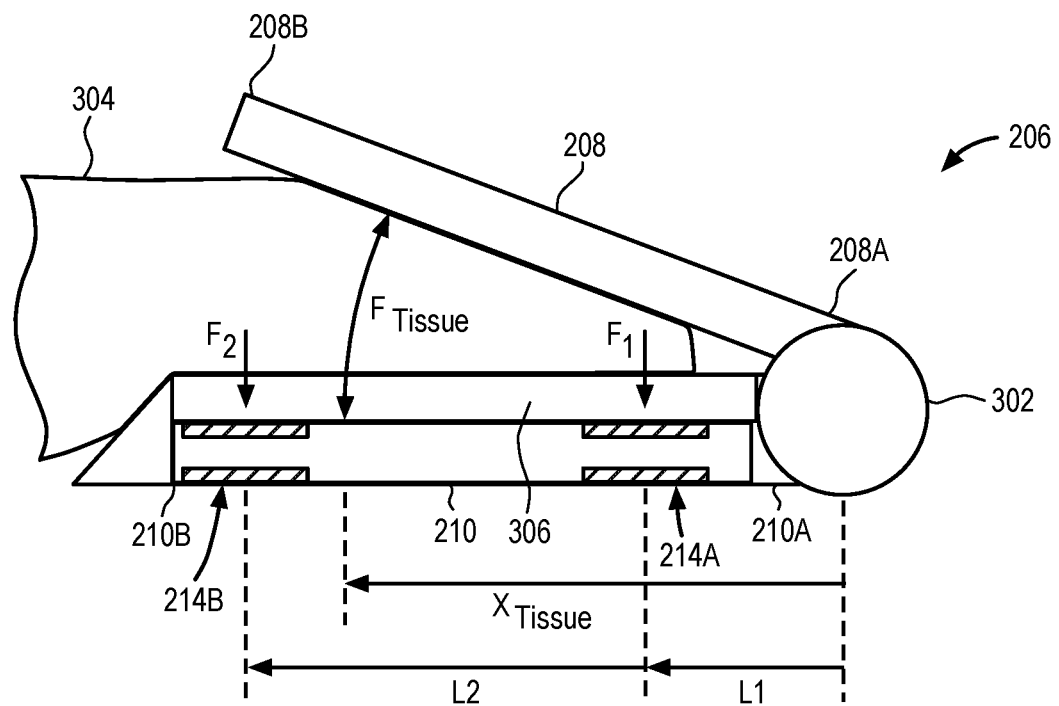
FIG. 4 is a cross-sectional side view of another aspect of a surgical stapler of a surgical robotic system.

A number of representative surgical stapler and sensor configurations will now be discussed in more detail in reference to FIGS. 3-17. Representatively, FIG. 3 and FIG. 4 illustrate cross-sectional side views of a surgical stapler jaw having sensors integrated therein. The surgical stapler jaw 206 may be the same jaw previously discussed in reference to FIG. 2 and include a first anvil 208 and a second anvil 210. From this view, it can be seen that the first anvil 208 rotates (or otherwise moves) relative to second anvil 210 about pivot joint 302 between an open position (shown) and a closed position. A stapler cartridge 306 may be coupled to second anvil 210. For example, stapler cartridge 306 may be inserted into the channel of second anvil 210 as previously discussed in reference to FIG. 2. A tissue 304 is further shown positioned within jaw 206 between first anvil 208 and stapler cartridge 306 of second anvil 210. Thus, the release (or firing) of a staple from stapler cartridge 306 will go through tissue 304 held within jaw 206 and staple the tissue portions together.

From this view, it can further be seen that at least two sensors 214A and 214B are integrated into second anvil 210. Sensors 214A, 214B may, for example, be force sensors that detect a force or pressure on second anvil 210 when jaw 206 clamps onto tissue 304. Representatively, sensors 214A, 214B may be capacitive force sensors. Sensors 214A, 214B may be mounted within the channel 212 of second anvil 210 such that they are underneath stapler cartridge 306. In one aspect, sensors 214A, 214B may consist of very thin capacitive plates positioned under the stapler cartridge 306. In this aspect, sensors 214A, 214B may be connected by channel 212 from underneath and the rigid stapler cartridge 306 above. Representatively, sensor 214A may include a capacitive or conducting plate 308A (e.g., an electrode) mounted within channel 212 and a capacitive or conducting plate 308A (e.g., an electrode) that are separated by a small gap as shown. Similarly, sensor 214B may include a capacitive or conducting plate 310A (e.g., an electrode) mounted within channel 212 and a capacitive or conducting plate 310B (e.g., an electrode) and separated by a gap. This configuration makes use of the rigidity of the stapler cartridge 306. A sensor rebias may further be used after stapler cartridge 306 is installed. It is noted that this aspect may be automated if the cartridge installation instant can be detected. When first anvil 208 is moved relative to second anvil 210 from the open position (FIG. 3) to a closed position (FIG. 4) the pressure from the tissue 304 compressed therein is detected by sensors 214A, 214B and, based on this information, a corresponding tissue force (Ftissue) can be determined.

Sensors 214A, 214B may be integrated into second anvil 210 at different known positions or locations so that different pressure and/or force readings can be detected and used to determine a characteristic associated with the stapling operation, for example, the clamping force, it's center of application, clamping force profile/variation along the jaw and/or stiffness of the clamped tissue layer. This characteristic or information may, in turn, be displayed to the surgeon and used to determine whether conditions are suitable for stapling to proceed. In still further aspects, the stapling operation may be automatically prevented depending on the detected information. Representatively, sensor 214A may be mounted at a known position or location near the proximal end 210A of second anvil 210. Sensor 214B may be mounted at a known position or location near the distal end 210B of second anvil 210. In this aspect, pressure or force readings at two different known locations along the second anvil 210 are detected. The two force readings from sensors 214A, 214B may then be analyzed to determine a total grasping force of the jaw and/or force application center location. This information can, in turn, be used by the surgeon to help identify the tissue they are grasping onto with the stapler 200 and help avoid improper stapling of a tissue.

In some aspects, a sensing algorithm may be used by one or more processors associated with the robotic surgical stapler 200 for analyzing the force or pressure information obtained by the sensors 214A, 214B. A representative sensing algorithm that may be used will now be described in detail in reference to FIGS. 4-5 and the following formulas. Representatively, as can be seen from the processing operation 500 disclosed in FIG. 5, readings from the base capacitive sensor (e.g., sensor 214A) and tip capacitive sensor (e.g., sensor 214B) are obtained at operation 502. In addition, installation of the stapler cartridge 306 is detected at operation 504. Once installation is detected, a zero-force (baseline) reading for each sensor 214A, 214B is established (e.g., C10 and C20). In some aspects, the installation of the cartridge 306 can be detected automatically by a magnet-Hall sensor pair located inside the cartridge 306 and the stapler channel 212. Afterwards, the change in each capacitance value from the baseline readings is continually computed at operation 506. The calibration constants (e.g., K1 and K2) are determined at operation 508, and the capacitance shifts (e.g., AC1 and AC2) are multiplied with the calibration constant of each sensor (e.g., K1 and K2) at operation 510 to compute the force (e.g., F1 and F2) at the distal end 210B and proximal end 208A of the jaw 206. Based on the resulting computed force values (F1 and F2) at operation 512, sensor geometry (physical location (L1 and L2) of the sensor along the anvil) at operation 514, and the torque balance about the pivot joint of the jaw, the total grasping force and the concentration point of the force are computed at operation 516 using the following Formulas (1) and (2):

$$F_{tissue}=F1+F2$$

$$X_{tissue}=L1+(F2/(F1+F2))*L2$$

Representatively, the summation of the forces F1 and F2 will provide the total tissue clamping force (Ftissue) as shown by the following Formula (1):

$$F_{tissue}=F1+F2$$

The center of application of the force may be determined as shown by the following Formula (2):

$$X_{tissue}=L1+(F2/(F1+F2))*L2$$

For example, returning to FIG. 4, the force value (F1) determined from sensor 214A and the force value (F2) determined from sensor 214B are added together to obtain the total clamping force (Ftissue). The location (L1) of sensor 214A at the proximal end (e.g., base capacitive sensor) is known and location (L2) of the sensor 214B at the distal end (e.g., tip capacitive sensor) is also known. If the moment at the same rotation point (hinge between anvil and base) is used, and the sensor geometry is known, the center of application of the force (Xtissue) can then be determined using the above formula. As can be seen from the representative illustration in FIG. 4, the center of application of the force (Xtissue) is determined to be closer to the distal end 210B than the proximal end 210A. This information may be displayed to the surgeon and the surgeon may use this information to determine whether stapling should proceed. For example, the surgeon may determine based on this information that tissue 304 is not centered, for example, tissue 304 is closer to the distal end than the proximal end. If stapling were to proceed, the staples released near the proximal end 210A may not contact any tissue. Thus, based on this information, the surgeon may determine stapling cannot proceed and that the tissue 304 should be re-centered to ensure proper stapling.

Figure 6:
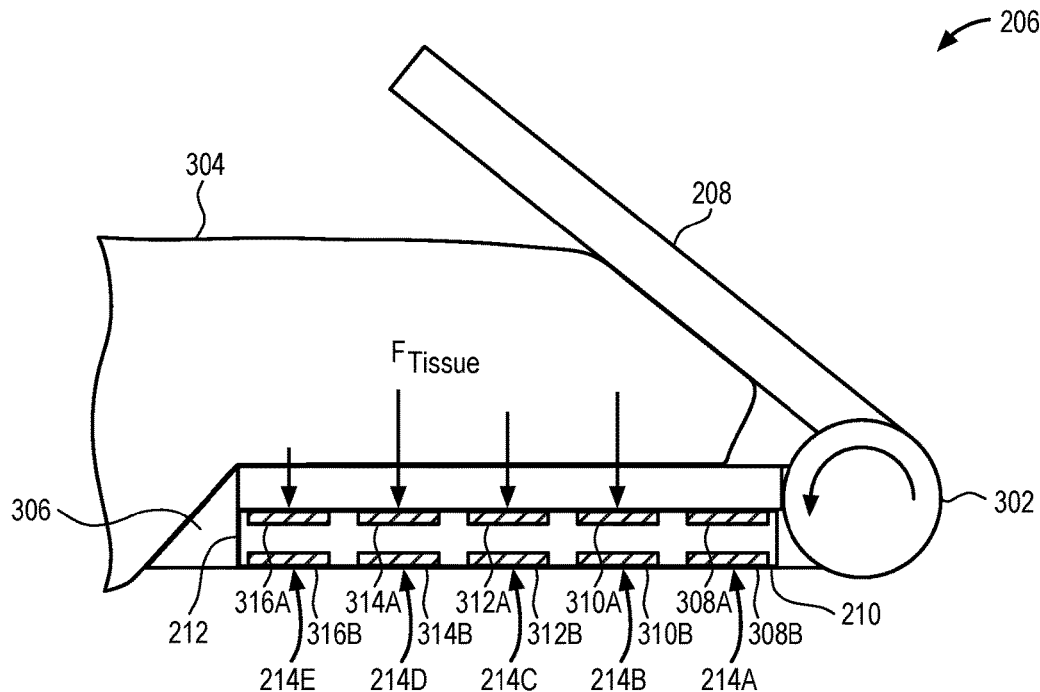
FIG. 6 is a cross-sectional side view of another aspect of a surgical stapler of a surgical robotic system.

Referring now to FIG. 6, FIG. 6 illustrates a cross-sectional side view of another aspect of a surgical stapler jaw having sensors integrated therein. The surgical stapler jaw 206 may be the same jaw previously discussed in reference to FIGS. 2-4 and include a first anvil 208 and a second anvil 210. First anvil 208 rotates (or otherwise moves) relative to the second anvil 210 about pivot joint 302 between an open position (shown) and a closed position. Stapler cartridge 306 may be coupled to second anvil 210 as previously discussed. Tissue 304 is further shown positioned within jaw 206 between first anvil 208 and stapler cartridge 306 of second anvil 210. Thus, the release (or firing) of a staple from stapler cartridge 306 will go through tissue 304 held within jaw 206 and staple the tissue portions together.

From this view, it can further be seen that an array of sensors 214A, 214B, 214C, 214D and 214E are integrated into second anvil 210. Sensors 214A-214E may, for example, be force sensors that detect a force or pressure on second anvil 210 when jaw 206 clamps onto tissue 304. Representatively, sensors 214A-214E may be capacitive force sensors that are considered to be discrete, or otherwise separate from each other. Each of sensors 214A-214E may be mounted within the channel 212 of second anvil 210 such that they are underneath stapler cartridge 306. For example, sensors 214A-214E may include very thin capacitive or conductive plates (e.g, electrodes) positioned under the stapler cartridge 306. Representatively, sensor 214A may include a pair plates 308A, 308B, sensor 214B may include plates 310A, 310B, sensor 214C may include a pair of plates 312A, 312B, sensor 214D may include a pair of plates 314A, 314B, and sensor 214E may include a pair of plates 316A, 316B. Plates 308A, 310A, 312A, 314A, 316A may be separated from their respective plate pair 308B, 310B, 312B, 314B, 316B by a gap to allow for capacitive sensing. For example, plates 308A, 310A, 312A, 314A, 316A may be mounted to the bottom surface of the channel 212 within second anvil 210. Plates 308B, 310B, 312B, 314B, 316B may be mounted to an opposite side of second anvil 210 such that they are aligned with and face a plate positioned on the bottom.

Each of sensors 214A-214E may be evenly spaced along second anvil 210 at known positions or locations such that they can be used to determine a force distribution profile along jaw 206. This information may, in turn, be displayed or otherwise provided to the surgeon to determine whether stapling should proceed. For example, this force distribution profile may detect a local stiffness or that a pressure on the jaw 206 is otherwise not uniform. Based on this information, the surgeon may determine that there is a lump (e.g., cancer or other impurity) in the tissue 304, or a foreign object within the jaw 206, and therefore determine stapling of tissue 304 should not proceed.

A sensing algorithm may be used by one or more processors associated with the robotic surgical stapler 200 for analyzing the force or pressure information obtained by the sensors 214A-214E. One representative sensing algorithm that may be used will now be described in detail in reference to previously discussed Formulas (1) and (2), and FIG. 7. Representatively, as can be seen from the processing operation 700 disclosed in FIG. 7, readings from the capacitive sensor array (e.g., sensors 214A-214E) are obtained at operation 702. In addition, installation of the stapler cartridge 306 may be detected at operation 704. Similar to the previous algorithm, each force sensor may be individually rebiased after the cartridge installation at operation 704. Then, multiplying at operation 708 with the calibration constant of each sensor (e.g, K1, K2, . . . , Kn)) determined at operation 706, the capacitance change from the baseline reading is converted to a force value (F1, F2, Fn) for each sensor at operation 708. Based on the resulting computed force values (F1, F2, Fn) illustrated at operation 710, and the sensor geometry at operation 712 (e.g., the locations of the sensors), a force distribution map along the anvil surface is generated at operation 714. The sum of individual sensor readings gives the total grasping or clamping force. The force concentration can be monitored based on the force distribution map. When a force concentration is found to be higher at one region than another, it can be determined that that region includes a local stiffness (e.g., a tumor) or perhaps that a foreign object is present at that region, such that stapling should not proceed at that region.

Figure 8:
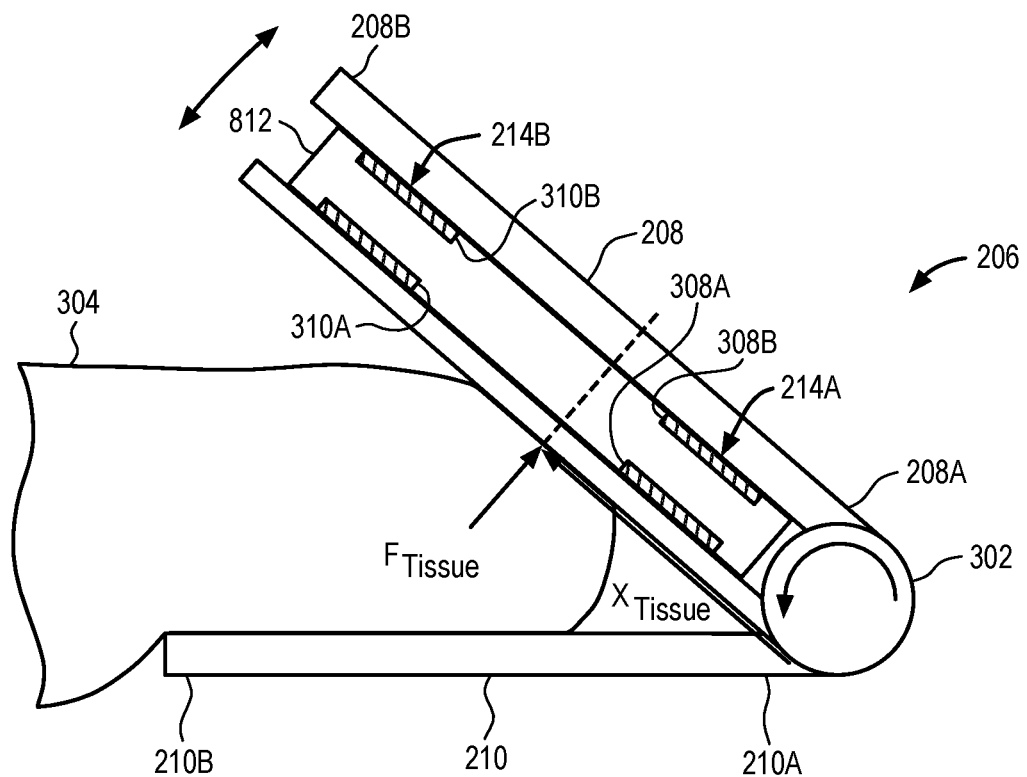
FIG. 8 is a cross-sectional side view of another aspect of a surgical stapler of a surgical robotic system.
Figure 9:
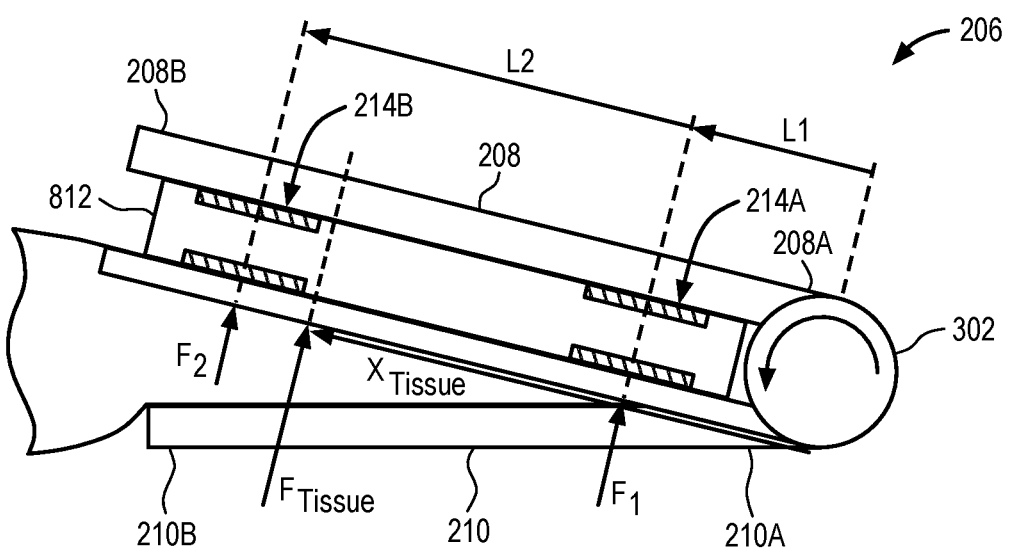
FIG. 9 is a cross-sectional side view of another aspect of a surgical stapler of a surgical robotic system.

Referring now to FIG. 8-FIG. 9, FIG. 8 and FIG. 9 illustrate cross-sectional side views of another aspect of a surgical stapler jaw having sensors integrated therein. The surgical stapler jaw 206 may be the same jaw previously discussed in reference to FIG. 2 and include a first anvil 208 and a second anvil 210. From this view, it can be seen that the first anvil 208 rotates (or otherwise moves) relative to second anvil 210 about pivot joint 302 between an open position (shown) and a closed position. Although not shown, a stapler cartridge (e.g., stapler cartridge 306) may be coupled to second anvil 210. A tissue 304 is further shown positioned within jaw 206 between first anvil 208 and second anvil 210. Thus, the release (or firing) of a staple from stapler cartridge (not shown) will go through tissue 304 held within jaw 206 and staple the tissue portions together.

From this view, it can further be seen that at least two sensors 214A and 214B are integrated into a channel 812 formed in first anvil 208. Sensors 214A, 214B may be the same sensors as those described in reference to the previously configurations, except in this configuration, they are mounted within first anvil 208 instead of second anvil 210. For example, sensors 214A-B may be force sensors that detect a force or pressure on first anvil 208 when jaw 206 clamps onto tissue 304. Representatively, sensors 214A, 214B may be capacitive force sensors. For example, sensors 214A, 214B may consist of thin capacitive plates 308A, 308B and 310A, 310B positioned along upper and lower surfaces of channel 812. Representatively, sensor 214A may include a first capacitive or conducting plate 308A and a second capacitive or conducting plate 308B mounted within channel 212 and separated by a small gap as shown. Similarly, sensor 214B may include a first capacitive or conducting plate 310A (e.g., an electrode) and a second capacitive or conducting plate 310B (e.g., an electrode) mounted within channel 212 and separated by a small gap. This configuration makes use of the rigidity of the first anvil 208. When first anvil 208 is moved relative to second anvil 210 from the open position (FIG. 8) to a closed position (FIG. 9)

the pressure from the tissue 304 compressed therein is detected by sensors 214A, 214B and, based on this information, a corresponding tissue force (Ftissue) can be determined.

Sensors 214A, 214B may be integrated into first anvil 208 at different known positions or locations so that different pressure and/or force readings can be detected and used to determine, for example, the clamping force, it's center of application, clamping force profile/variation along the jaw and/or stiffness of the clamped tissue layer. Representatively, sensor 214A may be mounted at a known position or location near the proximal end 208A of second anvil 210. Sensor 214B may be mounted at a known position or location near the distal end 210B of first anvil 208. In this aspect, pressure or force readings at two different known locations along first anvil 208 are detected. The two force readings from sensors 214A, 214B may then be analyzed to determine a total grasping force of the jaw and/or force application center location. This information can, in turn, be used by the surgeon to help identify the tissue they are grasping onto with the stapler 200 and help avoid improper stapling of a tissue.

Figure 5:
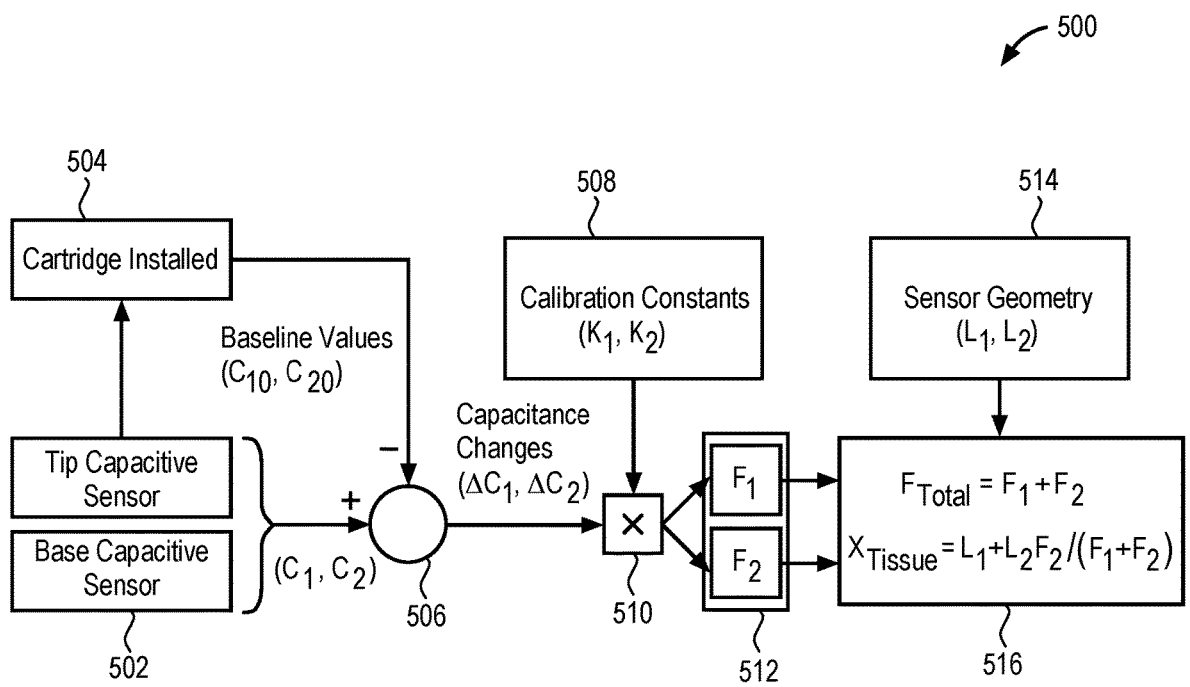
FIG. 5 is a block diaphragm of a processing operation for a surgical stapler of a surgical robotic system.

The sensing algorithm and processing operations previously discussed in reference to FIG. 3-FIG. 5 may be used to analyze the force or pressure information obtained by the sensors 214A, 214B. Representatively, using the following previously discussed Formulas (1) and (2), the summation of the forces F1 and F2 will provide the total tissue clamping force (Ftissue) as shown by the following Formula (1):

$$F_{tissue}=F1+F2$$

The center of application of the force may be determined as shown by the following Formula (2):

$$X_{tissue}=L1+(F2/(F1+F2))*L2$$

For example, as illustrated in FIG. 9, the force value (F1) determined from sensor 308 and the force value (F2) determined from sensor 310 are added together to obtain the total clamping force (Ftissue). The location (L1) of sensor 214A at the proximal end (e.g., base capacitive sensor) is known and location (L2) of the sensor 214B at the distal end (e.g., tip capacitive sensor) is also known. If the moment at the same rotation point (hinge between anvil and base) is used, and the sensor geometry is known, the center of application of the force (Xtissue) can then be determined using Formula (2). As can be seen from the representative configuration of FIG. 8, in the relatively open jaw position, the center of application of the force (Xtissue) is determined to be closer to the proximal end 208A than the distal end 208B. In FIG. 9, however, in which the jaw is closed and compressing the tissue, the center of application of the force (Xtissue) is determined to be closer to the distal end 208B than the proximal end 208A. This information may be displayed to the surgeon and the surgeon may use this information to determine whether stapling should proceed. For example, the surgeon may determine based on the center of application force (Xtissue) in FIG. 8 that tissue 304 is not properly positioned to proceed with stapling, while in FIG. 9, tissue 304 is properly positioned within the jaw 206 and stapling may proceed.

Figure 10:
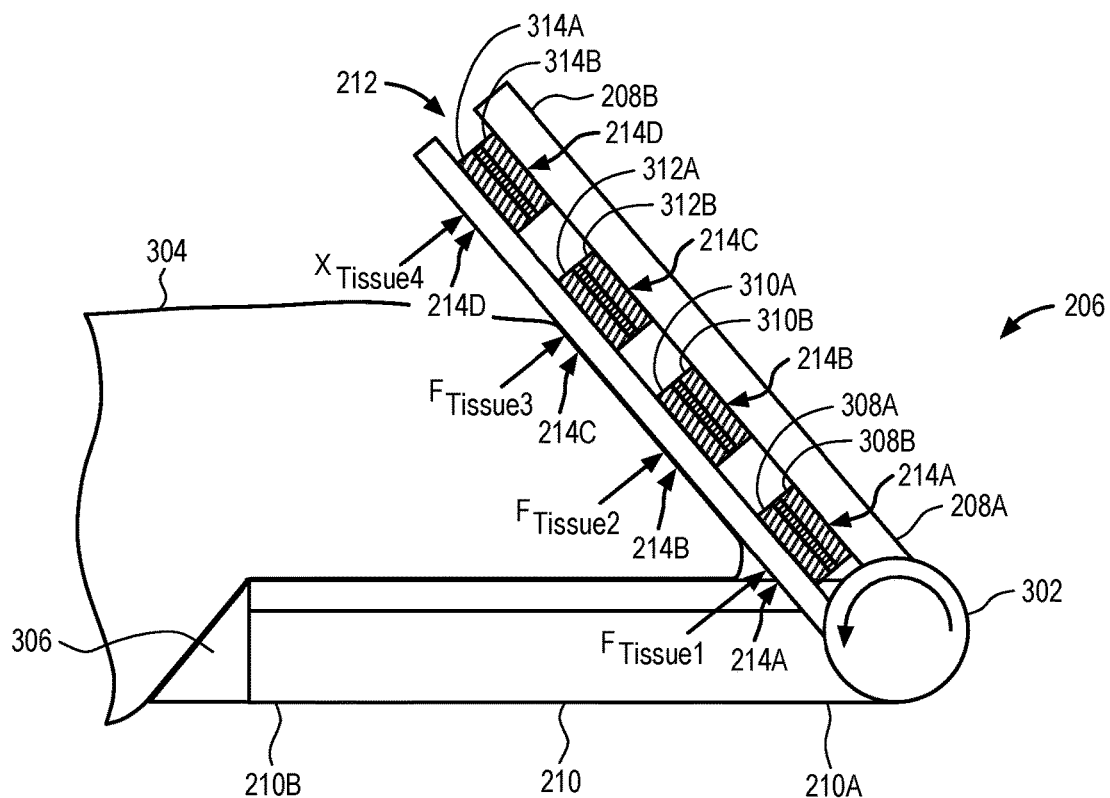
FIG. 10 is a cross-sectional side view of another aspect of a surgical stapler of a surgical robotic system.
Figure 11:
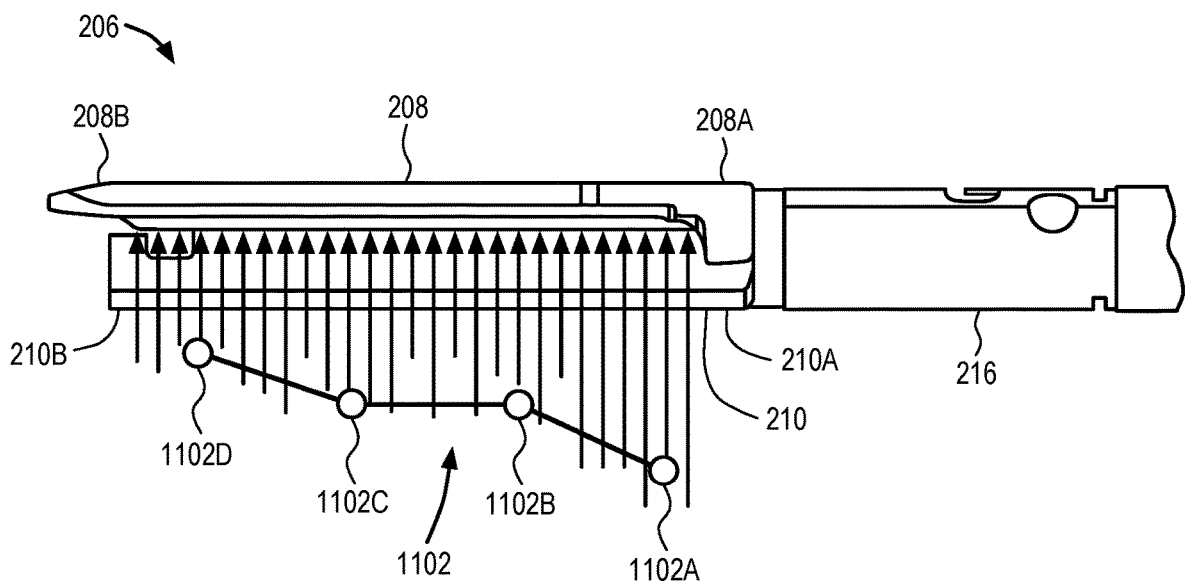
FIG. 11 is a side view of another aspect of a surgical stapler of a surgical robotic system.

Referring now to FIG. 10 and FIG. 11, FIG. 10 illustrates a cross-sectional side view of another aspect of a surgical stapler jaw having sensors integrated therein and FIG. 11 illustrates a representative pressure distribution profile along the jaw. The surgical stapler jaw 206 may be substantially the same as the previously discussed jaws and include a first anvil 208 and a second anvil 210. First anvil 208 rotates (or otherwise moves) relative to the second anvil 210 about pivot joint 302 between an open position (shown) and a closed position. Stapler cartridge 306 may be coupled to second anvil 210 as previously discussed. Tissue 304 is further shown positioned within jaw 206 between first anvil 208 and stapler cartridge 306 of second anvil 210. Thus, the release (or firing) of a staple from stapler cartridge 306 will go through tissue 304 held within jaw 206 and staple the tissue portions together.

From this view, it can further be seen that an array of sensors 214A, 214B, 214C and 214D are integrated into first anvil 208. Sensors 214A-214D may, for example, an array of force sensors as previously discussed in reference to FIG. 6, except in this configuration, the force sensors 214A-214D are mounted to first anvil 208. Representatively, sensors 214A-214D may be capacitive force sensors that are considered to be discrete, or otherwise separate from each other. Each of sensors 214A-214D may be mounted within the channel 212 of first anvil 208. For example, sensors 214A-214D may include capacitive or conductive plates (e.g., electrodes) mounted on opposite interfacing surfaces of first anvil 208. Representatively, sensor 214A may include a pair plates 308A, 308B, sensor 214B may include plates 310A, 310B, sensor 214C may include a pair of plates 312A, 312B, and sensor 214D may include a pair of plates 314A, 314B. Plates 308A, 310A, 312A, 314A may be separated from their respective plate pair 308B, 310B, 312B, 314B by a gap to allow for capacitive sensing. For example, plates 308A, 310A, 312A, 314A may be mounted to the bottom surface of the channel 212 within first anvil 208. Plates 308B, 310B, 312B, 314B may be mounted to an opposite side of first anvil 208 such that they are aligned with and face a plate positioned on the bottom. Sensors 214A-214D may measure local nodal forces, and in this approach, the anvil channel 212 surface may be segmented and sensitized. When tissue 304 is compressed, each segment will experience a slightly different level of compressive load and hence deformation. The sensitivity and rigidity of the sensing regions may be optimized to account for any deformation along the anvil's surface. Each of sensors 214A-214D may be evenly spaced along first anvil 208 at known positions or locations such that they can be used to determine a force distribution profile along jaw 206. This information may, in turn, be displayed or otherwise provided to the surgeon to determine information that may be used during the stapling operation. For example, this force distribution profile may detect a local stiffness or that a pressure on the jaw 206 is otherwise not uniform as previously discussed.

Figure 7:
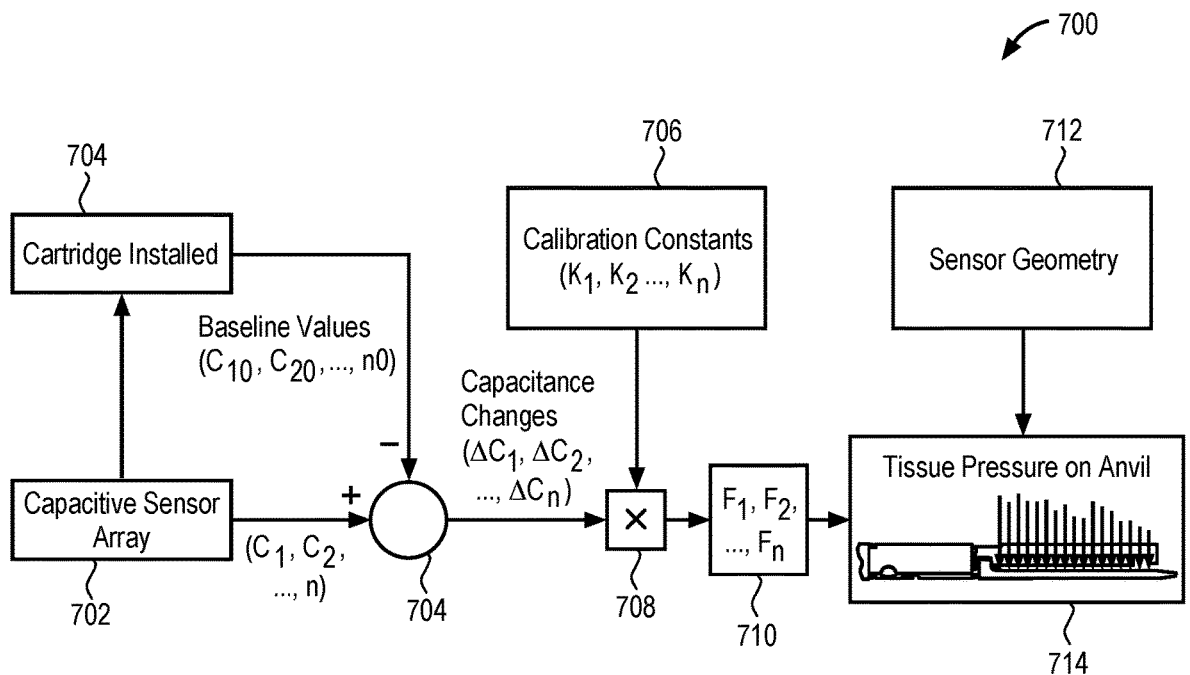
FIG. 7 is a block diaphragm of a processing operation for a surgical stapler of a surgical robotic system.

The sensing algorithm and processing operations previously discussed in reference to FIG. 6 and FIG. 7 may be used to determine a force or pressure distribution profile along the jaw 206 as illustrated in FIG. 11. Representatively, using Formula (1), localized force measurements (e.g., Ftissue1, Ftissue2, Ftissue3 and Ftissue4) are determined at the locations of sensor 214A-214D as shown in FIG. 10. Based on these localized force measurements, a force distribution map 1100 along the anvil surface is generated as shown in FIG. 11. The force distribution map 1100 may be displayed to the surgeon and used to monitor a force concentration along the jaw during a stapling operation. Representatively, based on force distribution map 1100, it can be understood that the force concentration at points 1102A (corresponding to sensor 214A location), 1102B (corresponding to sensor 214B location), 1102C (corresponding to sensor 214C location) and 1102D (corresponding to sensor 214D location) varies. For example, the force concentration appears to spike at point 1102C suggesting there may be a tissue stiffness or abnormality in the tissue at the location of sensor 214C. When a force concentration is found to be higher at one region than another (e.g., location of sensor 214C and/or location of sensor 214A) it can be determined that that region may include a tumor or perhaps that a foreign object is present at that region, such that stapling should not proceed at that region.

Figure 12:
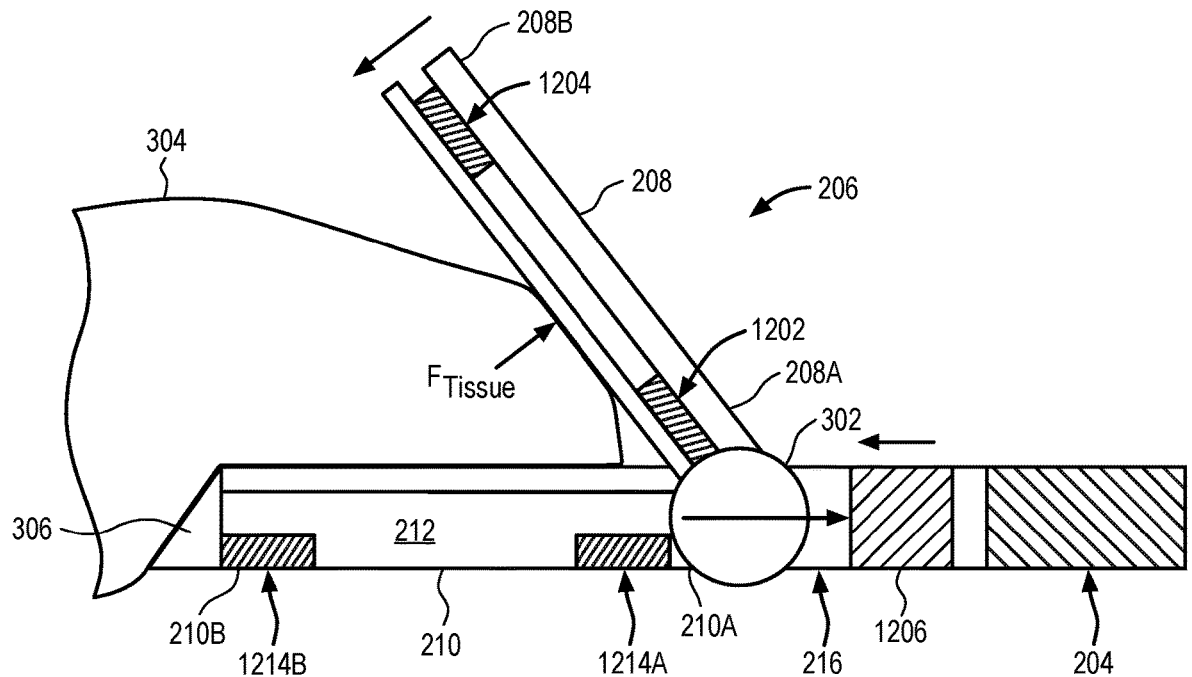
FIG. 12 is a cross-sectional side view of another aspect of a surgical stapler of a surgical robotic system.

Referring now to FIG. 12-FIG. 15, FIG. 12-FIG. 15 illustrate cross-sectional side views of another configuration of a surgical stapler jaw having sensors integrated therein and exemplary processing operations and/or algorithms for analyzing the sensor information. Referring now to FIG. 12, surgical stapler jaw 206 may be similar to the jaw previously discussed in reference to FIG. 2 and include a first anvil 208 and a second anvil 210. From this view, it can be seen that the first anvil 208 rotates (or otherwise moves) relative to second anvil 210 about pivot joint 302 between an open position (shown) and a closed position. A stapler cartridge 306 may be coupled to second anvil 210. For example, stapler cartridge 306 may be inserted into the channel of second anvil 210 as previously discussed in reference to FIG. 2. A tissue 304 is further shown positioned within jaw 206 between first anvil 208 and stapler cartridge 306 of second anvil 210. Thus, the release (or firing) of a staple from stapler cartridge 306 will go through tissue 304 held within jaw 206 and staple the tissue portions together.

From this view, it can further be seen that at least two sensors 1214A and 1214B are integrated into second anvil 210. In this configuration, sensors 1214A, 1214B may, for example, be Hall effect sensors that are paired with respective magnets 1202 and 1204 mounted to first anvil 206. Representatively, sensor 1214A may be mounted to a proximal end 210A of second anvil 210 and aligned with magnet 1202 mounted to a proximal end 208A of first anvil 208. Sensor 1214B may be mounted to a distal end 210B of second anvil 210 and aligned with magnet 1204 mounted to a distal end 208B of first anvil 208. In addition, a sensor 1206 may be mounted to ring 216, which as previously discussed, connects jaw 206 to shaft 204. Sensor 1206 may be a capacitive force sensor as discussed in reference to the previously configurations. The information obtained from each of the sensors 1214A-B paired with magnets 1202, 1204 and sensor 1206 may be used to determine an indirect force measurement at the anvil. Representatively, to close jaw 206, first anvil 208 is moved down by pushing ring 216 forward (e.g. toward distal ends 208B, 210B), putting compressive stress on the ring 216 that is correlated with the grasping force and tissue resistance applied on anvil 208. The capacitive force sensor 1206 on the ring 216 therefore measures 1-DOF axial load on the actuation ring 216. Representatively, capacitive force sensor 1206 at ring 216 measures the cumulative compressive load applied on the ring 216 to push down first anvil 208. This compressive load will therefore increase as jaw 206 closes. The magnet-Hall sensor pairs 1214A-B, 1202-1204 measure the opening at the base (e.g., jaw proximal end) and tip (e.g., jaw distal end). As jaw 206 closes, if there is too much resistance from tissue 304, first anvil 208 will deform, which will cause mismatch between the tip and base openings measured by magnet-Hall sensor pairs 1214A-B, 1202-1204. Moreover, the force detected by sensor 1206 will rise rapidly. This information may, in turn, help detect a foreign object or stiff tissue impurity within jaw 206.

Figure 13:
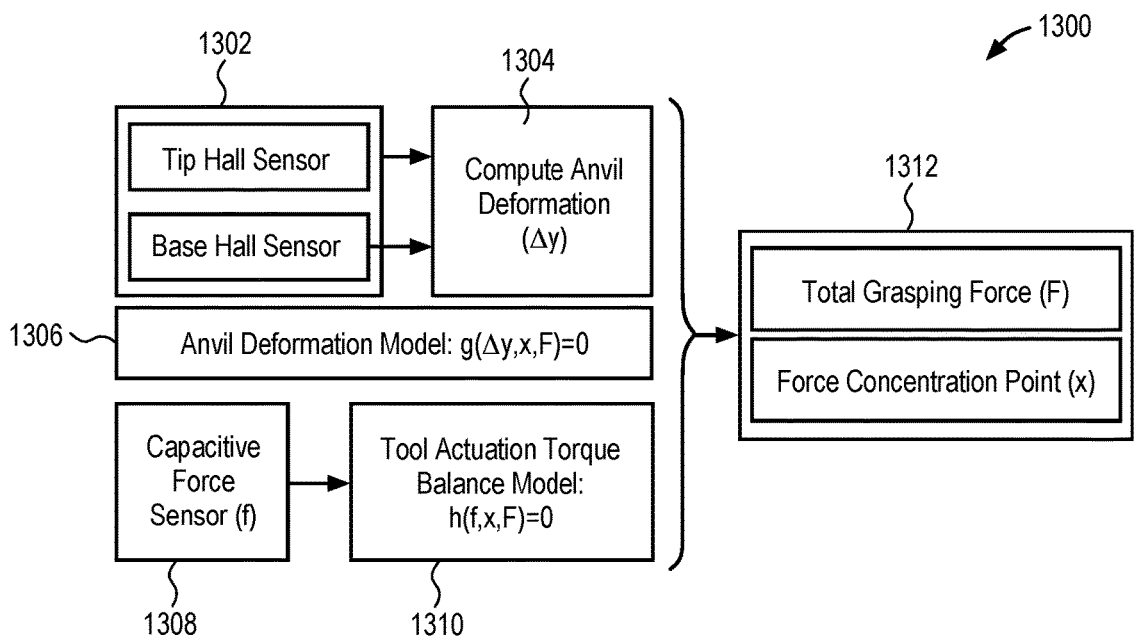
FIG. 13 is a block diaphragm of a processing operation for a surgical stapler of a surgical robotic system.

A representative processing operation and algorithm for analyzing the information obtained using the sensor configuration of FIG. 12 will now be described in more detail in reference to FIG. 13. Representatively, as can be seen from process 1300, in this architecture, the tip and base hall sensor pairs (e.g., magnet-Hall sensor pairs 1214A-B, 1202-1204) output sensor information at operation 1302. In particular, as first anvil 208 closes, first anvil 208 deforms under the tissue compression force. The tip Hall sensor pair (e.g., 1214B, 1204) outputs a first distance value corresponding to a distance between first and second anvils 208, 210 at the tip (e.g., distal end 208B, 210B). Similarly, the base Hall sensor pair (e.g., 1214A, 1202) outputs a second distance value corresponding to a distance between first and second anvils 208, 210 at the base (e.g., proximal end 208A, 210A). Based on these two distance, and by comparing them to the undeformed geometry knowledge of first anvil 208, the deformation of the anvil ($\Delta y$) can be detected continuously at operation 1304. The anvil deformation ($\Delta y$) can be modeled as a function of the tissue force (F) and its concentration distance from the base joint (x) (e.g., pivot joint 302), both of which are unknowns and can be computed using the following deformation model at operation 1306:

$$g(\Delta y, x, F) = 0$$

In addition to the deformation model, the compressive force on the actuation ring (f) sensed by the force sensor 1206 on ring 216 is provided at operation 1308. The force balance equation on the stapler closure mechanism that establishes a correlation between the tissue compression force (F) and the compressive force on the actuation ring (f) sensed by the force sensor on the tool shaft may then be applied at operation 1310. A representative tool actuation torque balance model equation at operation 1310 may be the following:

$$h(f, x, F) = 0$$

It should be understood that while the anvil deformation ($\Delta y$) and compressive force (f) values are continuously updated by the integrated Hall sensors and force sensor respectively, the algorithms at operations 1306 and 1310 can be used simultaneously to compute the total tissue grasping force (F) and locate its concentration point (x) at operation 1312.

Figure 14:
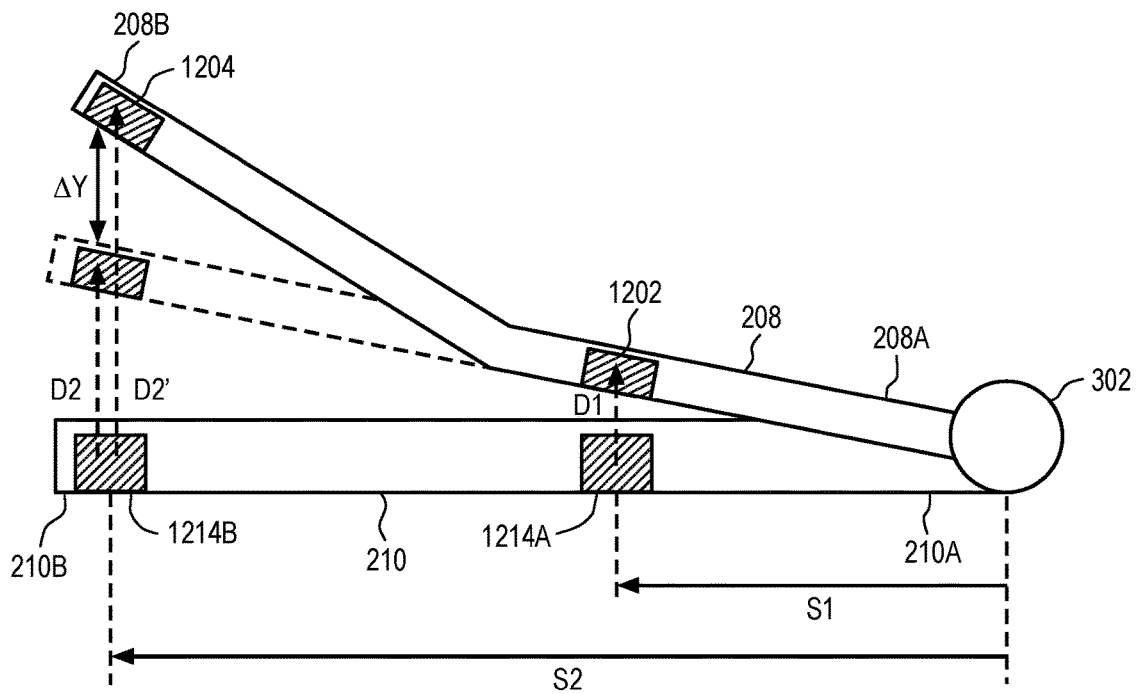
FIG. 14 is a cross-sectional side view of another aspect of a surgical stapler of a surgical robotic system.

One representative computation using the stapler sensor configuration of FIG. 12-FIG. 13 will now be discussed in detail in reference to FIG. 14-FIG. 15 and the formulas that follow. Representatively, anvil 208 can be structurally simplified to a cantilever beam with some unknown concentrated load (tissue compression force F) located at some unknown point along the beam (x), modeling its deflection at its tip ($\Delta y$) using well known beam deflection formulae. For example, the following maximum deflection formula is known:

$$\Delta y = \frac{Fx^2}{6EI}(3L - x)$$

Where E is the modulus of elasticity, I is the moment of inertia, L is the total length of anvil, x is the distance of the force concentration point from the rotary joint of the stapler, and F is the applied force on the anvil. This equation can be rearranged to obtain the following function of the form:

$$g(\Delta y, x, F) = Fx^3 - 3FLx^2 + 6EI\Delta y = 0$$

In this equation, $\Delta y$ is an actively measured (known) quantity that is provided by the Hall sensors. For example, as shown in FIG. 14, the regular anvil shape (e.g, non-deformed) will have an opening distance (D2). When the anvil deforms due to the tissue force during compression, the Hall sensors will measure an opening distance (D2'). Δy may correspond to the difference between D2 and D2'. Then, based on prior knowledge of where these sensors are located on the anvil (S1 and S2 in FIG. 14), and the opening distance measured by each Hall sensor (D1 and D2' in FIG. 14), the deformation of the anvil can be computed as follows:

$$D2 = \frac{S1 \cdot D2}{D1}$$

$$\Delta Y = D2' - D2$$

Figure 15:
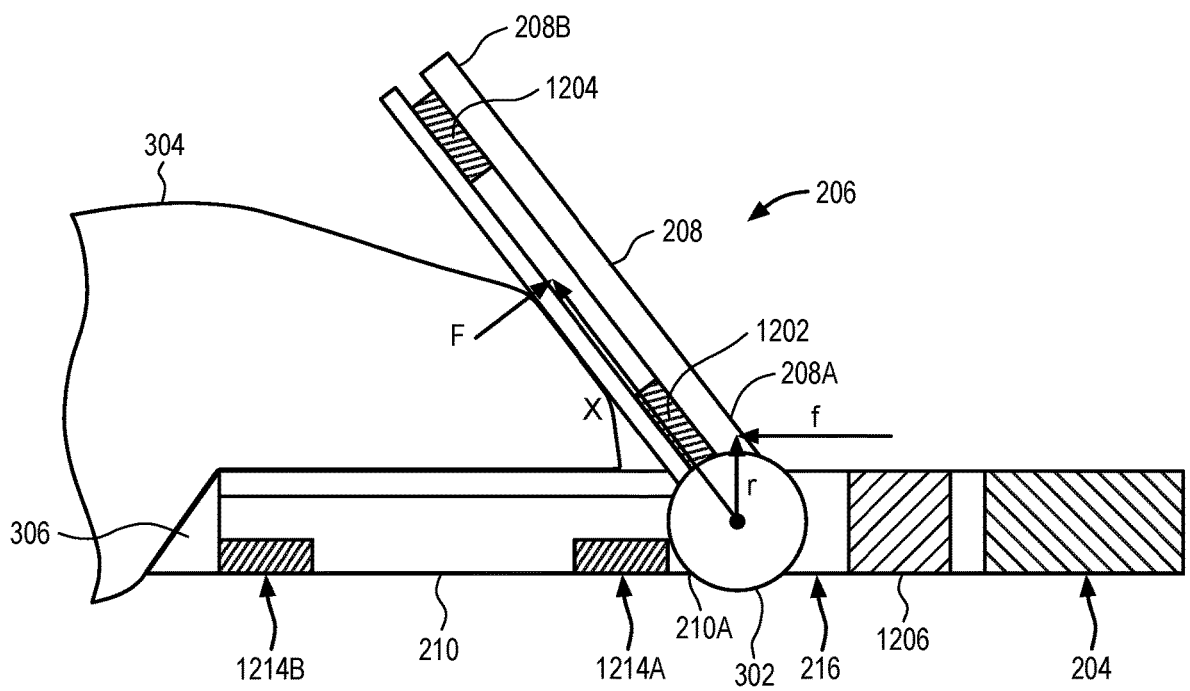
FIG. 15 is a cross-sectional side view of another aspect of a surgical stapler of a surgical robotic system.

Also, the torque balance on the actuation joint 302 of the jaw 206 as shown in FIG. 15 implies the following relation:

$$f \cdot r = F \cdot x$$

Where f is the force sensed by the capacitive sensor (e.g., sensor 1206) on ring 216, r is the radius of the pivot joint 302 providing the closure of the anvils 208, 210. This equation can be rearranged to obtain the following function of the form:

$$h(f,x,F) = F \cdot x - f \cdot r = 0$$

These two equations can be rearranged to have the following second order equation to solve for the force concentration point x:

$$x^2 - 3Lx + \frac{6EI\Delta y}{fr} = 0$$

After x is found, it is substituted into h(f,x,F) to compute the total clamping force (F) as follows:

$$F = \frac{f \cdot r}{x}$$

Thus, the unknowns (F, x) from the previously discussed anvil deformation and balance model equations can be solved simultaneously to compute the total tissue compression force (F) and locate its concentration point (x) at operation 1312 of process 1300.

Figure 16:
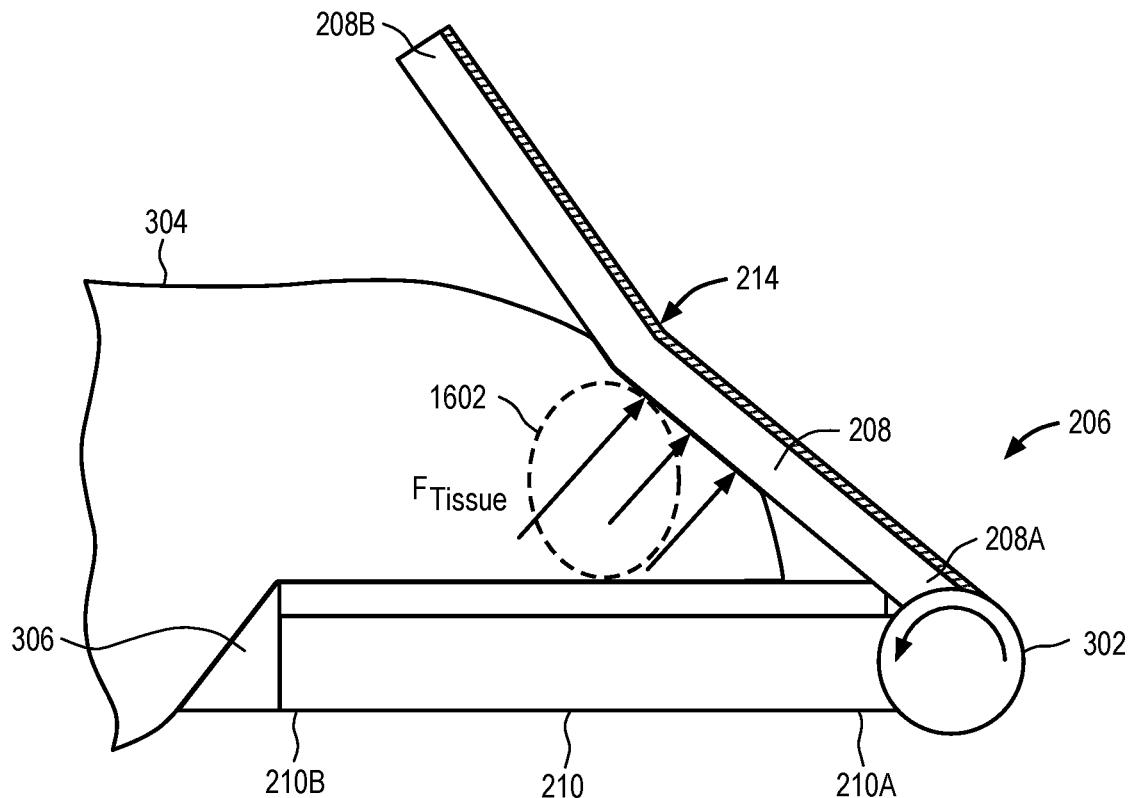
FIG. 16 is a cross-sectional side view of another aspect of a surgical stapler of a surgical robotic system.
Figure 17:
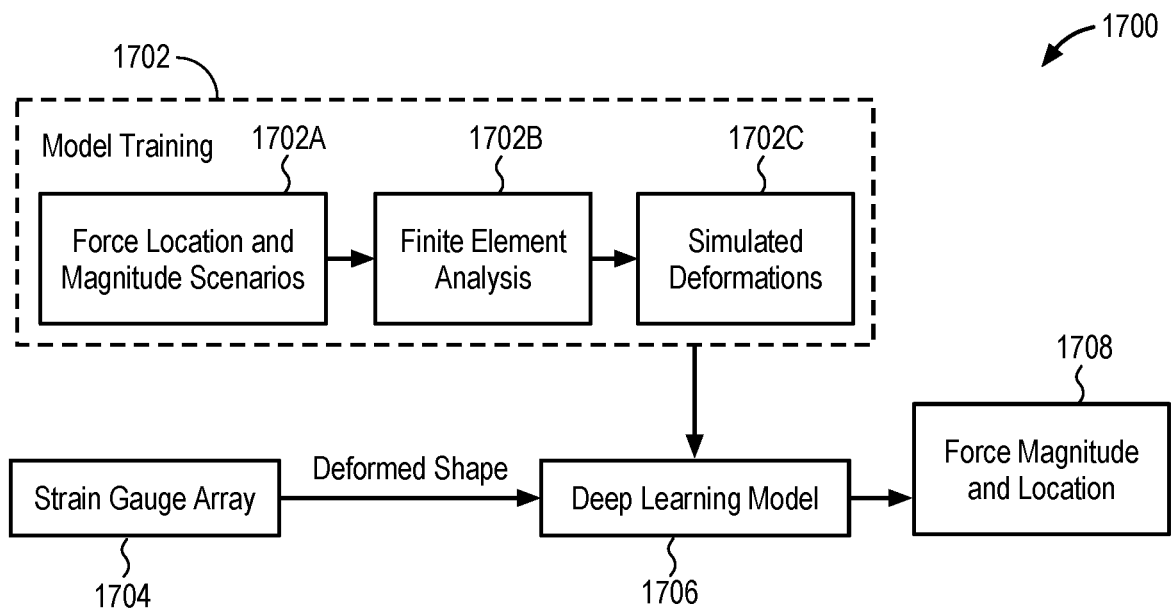
FIG. 17 is a block diaphragm of a processing operation for a surgical stapler of a surgical robotic system.

Referring now to FIG. 16-FIG. 17, FIG. 16-FIG. 17 illustrate cross-sectional side views of another configuration of a surgical stapler jaw having sensors integrated therein and exemplary processing operations and/or algorithms for analyzing the sensor information. Representatively, surgical stapler jaw 206 may be the same jaw previously discussed in reference to FIG. 2 and include a first anvil 208 and a second anvil 210. From this view, it can be seen that the first anvil 208 rotates (or otherwise moves) relative to second anvil 210 about pivot joint 302 between an open position (shown) and a closed position. A stapler cartridge (e.g., stapler cartridge 306) may be coupled to second anvil 210. A tissue 304 is further shown positioned within jaw 206 between first anvil 208 and second anvil 210. Thus, the release (or firing) of a staple from stapler cartridge (not shown) will go through tissue 304 held within jaw 206 and staple the tissue portions together.

From this view, it can further be seen that sensor 214 is mounted to first anvil 208. In this configuration, sensor 214 may be an array of resistive strain gauge sensors or optical strain gauge sensors (e.g., multi-core fiber-Bragg gratings). Sensor 214 may be mounted on the upper or inner surfaces of first anvil 208. In the illustrated configuration, sensor 214 is mounted to the upper surface of first anvil 208. Sensor 214 may extend along the entire surface, from the proximal end 208A to the distal end 208B. Each of the strain gauges within the sensor 214 measure the local deformations on first anvil 208, for example due to local stiffness or irregularity 1602 in tissue 304. Combining the local deformation (strain) data, the deformed shape of the anvil is then determined. With the knowledge of anvil geometry and model, deformation of anvil 214 under various locations and levels of grasping force can be modeled through finite element analysis (FEA). Prior to the use of the instrument, based on numerous scenarios of differing force levels and locations, training datasets can be formed by finite element analysis (FEA) simulations. During the clinical use, the datasets can be used to inversely map the sensed deformations (from the strain gauges) to the applied total force magnitude and concentration point. This can be achieved by training and using a deep learning model.

FIG. 17 illustrates a representative processing operation and/or algorithm using the stapler/sensor configuration of FIG. 16. Representatively, process 1700 may include model training as illustrated at operation 1702. The model training may take into account force location and magnitude scenarios at operation 1702A, finite element analysis at operation 1702B and simulated deformation at operation 1702C. In addition, process 1700 may include providing strain gauge array information relating to local deformations of the anvil at operation 1704. This information may then be analyzed at operation 1706 using the deep learning model developed by the training model at operation 1702 to determine the force magnitude and location at operation 1708. The information obtained by process 1700 may, in turn, be displayed to, or otherwise used by, the surgeon to determine whether or not to proceed with a stapling operation.

It should be understood that while a number of different sensor configurations and arrangements for a surgical stapler are disclosed herein, any one or more of the disclosed sensor configurations or arrangements may be used alone, or in combination. For example, the strain gauge array sensor 214 configuration of FIG. 16 may be used in combination with one or more of the other sensor configurations. For example, a strain gauge sensor array may be coupled to the first anvil 208 as described in FIG. 16 and one or more force sensors (e.g., capacitive sensors) may be coupled to second anvil 210 as described in FIG. 3-FIG. 7.

Moreover, for all the sensor configurations disclosed herein, the raw data can be transmitted to a centralized processor (e.g., central PC) wirelessly via Bluetooth, by locating a power source and a Bluetooth transmitter inside the instrument handle. After the sensor data is acquired by a central processing PC, it can be used as inputs to the presented algorithms and/or other AI models to detect various clinically important events, assign warnings or alerts to the operator and/or take automatic actions in several ways to assist the surgical procedure. For example, if the detected total force is below a certain threshold, then it may be determined that the tissue has not been clamped firm enough to ensure proper stapling. If the detected force level is low, then a warning or alert can be displayed to the operator. The warning or alert may be a visual warning or alert such as a light blinking, text describing the issue on the display, or the like. Alternatively, the warning or alert may be a haptic warning or alert such as a vibration or other physical cue to the surgeon. If operating manually, the staple firing can be automatically prevented if the detected grasping force is found to be not sufficient.

Alternatively, if the force is not centrally located along the jaws, this may mean the tissue is too close to either the tip or the base of the stapling surface for stapling. Based on sensed concentration point, if the tissue is not centrally located along the jaws, a warning can be displayed to the operator. In addition, a map showing the location of force concentration point in real time can be shown on a display to help surgeon better align the tissue between the graspers manually. Alternatively, if it's a robotic instrument, based on the sensed position of the tissue (force concentration point), robot can be commanded to automatically adjust tissue/tool alignment such that the force is centrally concentrated.

Still further, the rate of change of force magnitude over time and the rate of change in force concentration position over time can be monitored to detect inhomogeneities in grasped tissue (such as stiffer tumors) and/or plastic/metal clamps. Gradual changes in force and force concentration point are expected. However, if the force level rises suddenly and/or the force concentration point shift suddenly, then this may signal an impurity between the jaw of the stapler. If such impurities are present in the grasped tissue, a warning can be displayed to the operator and the firing of staples can actively be prevented (disabling the firing function in case of a robotic case).

In addition, by continually monitoring the grasping force and the change in grasper closure, the overall stiffness of the tissue between the graspers can be computed in real time (k=ForceChange/Displacement). The detected tissue stiffness can be used in various ways: it can inform the operator of the tissue type, it can be used to compare with the expected range of stiffness and inspect the grasped tissue against any abnormalities, and help detect tumors and/or impurities (foreign materials) inside the grasped tissue.

Figure 18:
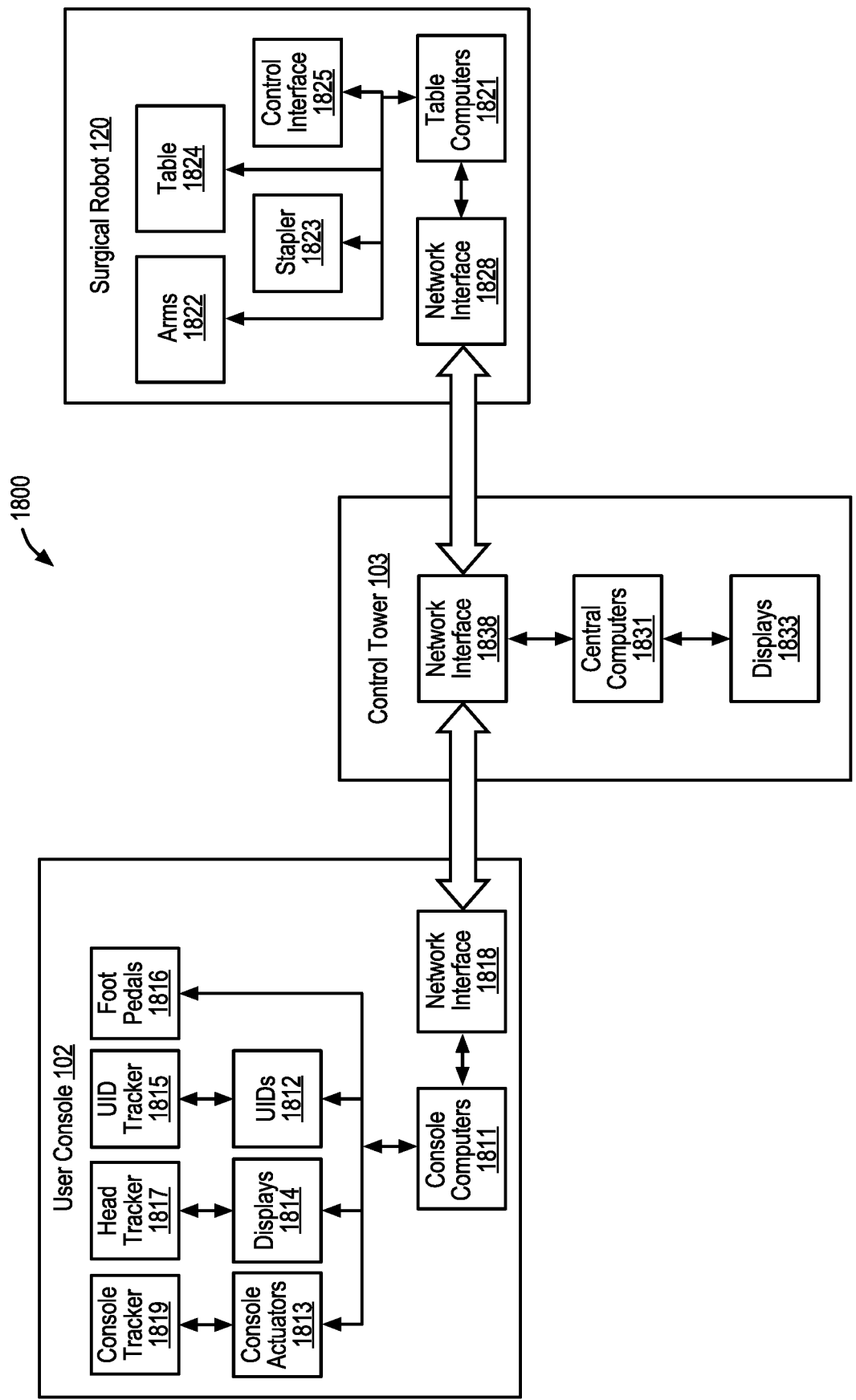
FIG. 18 is a block diagram of a computer portion of a surgical robotic system including a surgical stapler, in accordance with an embodiment.

FIG. 18 is a block diagram of a computer portion of a surgical robotic system, which is operable to implement any one or more of the previously discussed operations. The exemplary surgical robotic system 1800 may include a user console 102, a surgical robot 120, and a control tower 103. The surgical robotic system 1800 may include other or additional hardware components; thus, the diagram is provided by way of example and not a limitation to the system architecture.

As described above, the user console 102 may include console computers 1811, one or more UIDs 1812, console actuators 1813, displays 1814, foot pedals 1816, console computers 1811 and a network interface 1818. In addition, user console 102 may include a number of components, for example, a UID tracker(s) 1815, a display tracker(s) 1817 and a console tracker(s) 1819, for detecting various surgical conditions required for operation of the system (e.g., UID orientation, orientation of the surgeon relative to the display, orientation the console seat, etc). It should further be understood that a user or surgeon sitting at the user console 102 can adjust ergonomic settings of the user console 102 manually, or the settings can be automatically adjusted according to user profile or preference. The manual and automatic adjustments may be achieved through driving the console actuators 1813 based on user input or stored configurations by the console computers 1811. The user may perform robot-assisted surgeries by controlling the surgical robot 120 using one or more master UIDs 1812 and foot pedals 1816. Positions and orientations of the UIDs 1812 are continuously tracked by the UID tracker 1815, and status changes are recorded by the console computers 1811 as user input and dispatched to the control tower 103 via the network interface 1818. Real-time surgical video of patient anatomy, instrumentation, and relevant software apps can be presented to the user on the high resolution 3D displays 1814 including open or immersive displays.

The user console 102 may be communicatively coupled to the control tower 103. The user console also provides additional features for improved ergonomics. For example, the user console may be an open architecture system including an open display, although an immersive display, in some cases, may be provided. Furthermore, a highly-adjustable seat for surgeons and master UIDs tracked through electromagnetic or optical trackers are included at the user console 102 for improved ergonomics.

The control tower 103 can be a mobile point-of-care cart housing touchscreen displays, computers that control the surgeon's robotically-assisted manipulation of instruments, safety systems, graphical user interface (GUI), light source, and video and graphics computers. As shown in FIG. 18, the control tower 103 may include central computers 1831 including at least a visualization computer, a control computer, and an auxiliary computer, various displays 1833 including a team display and a nurse display, and a network interface 1838 coupling the control tower 103 to both the user console 102 and the surgical robot 120. The control tower 103 may offer additional features for user convenience, such as the nurse display touchscreen, soft power and E-hold buttons, user-facing USB for video and still images, and electronic caster control interface. The auxiliary computer may also run a real-time Linux, providing logging/monitoring and interacting with cloud-based web services.

The surgical robot 120 may include an operating table 1824 with a plurality of integrated robotic arms 1822 that can be positioned over the target patient anatomy. A surgical stapler 1823 can be attached to or detached from the distal ends of the arms 1822, enabling the surgeon to perform various surgical procedures. The surgical stapler 1823 may be any one or more of the surgical staplers having sensors integrated therein as previously discussed in reference to FIG. 2-FIG. 17. The surgical robot 120 may also comprise control interface 1825 for manual or automated control of the arms 1822, table 1824, and tools 1823. The control interface can include items such as, but not limited to, remote controls, buttons, panels, and touchscreens. Other accessories such as trocars (sleeves, seal cartridge, and obturators) and drapes may also be needed to perform procedures with the system. In some variations, the plurality of the arms 1822 includes four arms mounted on both sides of the operating table 1824, with two arms on each side. For certain surgical procedures, an arm mounted on one side of the table can be positioned on the other side of the table by stretching out and crossing over under the table and arms mounted on the other side, resulting in a total of three arms positioned on the same side of the table 1824. The surgical tool can also comprise table computers 1821 and a network interface 1828, which can place the surgical robot 120 in communication with the control tower 103.

The foregoing description, for purposes of explanation, used specific nomenclature to provide a thorough understanding of the invention. However, it will be apparent to one skilled in the art that specific details are not required in order to practice the invention. Thus, the foregoing descriptions of specific aspects of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, and they thereby enable others skilled in the art to best utilize the invention and various embodiments with various modifications as are suited to the particular use contemplated.

What is claimed is:

1. A surgical stapler for a surgical robotic system, the surgical stapler comprising:
    a jaw coupled to a base, the jaw having an anvil that moves relative to a jaw portion between an open position and a closed position;
    an array of sensors comprising a first force sensor and a second force sensor operable to detect a force applied to the jaw over time to determine a rate of change in force concentration position, the first force sensor comprising a first capacitive plate and a second capacitive plate coupled to interfacing surfaces of a first channel within the anvil, and the second force sensor comprising a first capacitive plate and a second capacitive plate coupled to interfacing surfaces of the first channel within the first anvil; and
    a third force sensor coupled to an actuation ring of the base and operable to measure a compressive axial stress on the actuation ring that is correlated to the force applied to the jaw.

2. The surgical stapler of claim 1 wherein the first force sensor is a capacitive sensor and the first capacitive plate is aligned across a gap within the first channel with the second capacitive plate.

3. The surgical stapler of claim 1 wherein the second force sensor is a capacitive sensor and the first capacitive plate is aligned across a gap within the first channel with the second capacitive plate.

4. The surgical stapler of claim 3 further comprising a second channel within the jaw portion that is operable to receive a staple cartridge and comprising a fourth force sensor between the staple cartridge and a bottom surface of the second channel.

5. The surgical stapler of claim 1 wherein the actuation ring of the base is movable relative to the jaw.

6. The surgical stapler of claim 5 wherein the surgical stapler further comprises at least one magnet coupled to the anvil and at least one Hall effect sensor coupled to the jaw portion.

7. The surgical stapler of claim 1 wherein the first force sensor is coupled to a distal end of the anvil and the second force sensor is coupled to a proximal end of the anvil.

8. The surgical stapler of claim 1 wherein the array of sensors further detect a rate of change of force magnitude.

9. The surgical stapler of claim 1 wherein the force detected by the first force sensor and the second force sensor is analyzed by one or more processors coupled to the surgical stapler to determine whether a total clamping force or a force application center location is suitable for proceeding with a stapling operation.

10. The surgical stapler of claim 1 further comprising a strain gauge array operable to detect a deformation of the jaw, the strain gauge array extending from a proximal end to a distal end of the anvil.

11. A surgical robotic stapler system, the system comprising:
    a robotic surgical stapler having a jaw coupled to a base, the jaw having an anvil that moves relative to a jaw portion between an open position and a closed position during a stapling operation;
    an array of force sensors configured to detect a force applied to the jaw and provide a force value, at least one force sensor of the array of force sensors comprises a first electrode and a second electrode coupled to the anvil or the jaw portion, the first electrode is coupled to a bottom surface of a channel within the anvil or the jaw portion and the second electrode is aligned with the first electrode;
    a capacitive force sensor coupled to an actuation ring of the base and operable to measure a compressive axial stress on the actuation ring that is correlated to the force applied to the jaw; and
    one or more processors configured to analyze the force value and the compressive axial stress to a rate of change in force concentration position over time and a characteristic relating to the stapling operation.

12. The surgical robotic stapler system of claim 11 wherein the array of force sensors comprises at least two force sensors that each detect a force and provide a force value, and wherein the characteristic determined by analyzing the force value comprises (1) a total clamping force on a tissue or (2) a center of application of the force on the tissue.

13. The surgical robotic stapler system of claim 12 wherein based on the determined total clamping force on the tissue, the one or more processors further determine whether the clamping force is suitable for the stapling operation to proceed.

14. The surgical robotic stapler system of claim 12 wherein based on the determined center of application of the force on the tissue, the one or more processors further determine whether the tissue is at an acceptable position within the jaw to proceed with the stapling operation.

15. The surgical robotic stapler system of claim 11 wherein the characteristic determined by analyzing the force value comprises a force distribution profile along the jaw used to determine whether a local stiffness is present in a tissue.

16. The surgical robotic stapler system of claim 11 wherein the one or more processors are further operable to determine a rate of change of force magnitude and an increase in the rate of change of force concentration position and indicate an impurity in a tissue grasped by the jaw.

17. The surgical robotic stapler system of claim 15 wherein based on the force distribution profile, the one or more processors further determine whether a foreign object is positioned within the jaw.

18. The surgical robotic stapler system of claim 11 wherein the characteristic determined by analyzing the force value comprises a deformation of the anvil or the jaw portion.

19. The surgical robotic stapler system of claim 18 wherein based on the deformation of the anvil or the jaw portion, the one or more processors further determine a type of tissue in the jaw.

20. The surgical robotic stapler system of claim 11 further comprising an alerting mechanism for alerting a user when the determined characteristic indicates the stapling operation should not proceed.

* * * * *

UNITED STATES PATENT AND TRADEMARK OFFICE
CERTIFICATE OF CORRECTION

PATENT NO. : 12,433,588 B2  
APPLICATION NO. : 17/504880  
DATED : October 7, 2025  
INVENTOR(S) : Berk Gonenc et al.

Page 1 of 1

It is certified that error appears in the above-identified patent and that said Letters Patent is hereby corrected as shown below:

In the Claims

Column 22  
Line 15, Claim 11, please add "determine" after "to" and before "a rate of change"

Signed and Sealed this  
Fourth Day of November, 2025

John A. Squires  
*Director of the United States Patent and Trademark Office*